United States Patent
Leung et al.

(10) Patent No.: US 10,110,801 B2
(45) Date of Patent: Oct. 23, 2018

(54) METHODS AND SYSTEMS FOR CONTROLLING A CAMERA TO PERFORM A TASK

(71) Applicant: CANON KABUSHIKI KAISHA, Tokyo (JP)

(72) Inventors: Ka Ming Leung, Marsfield (AU); Geoffrey Richard Taylor, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 15/190,510

(22) Filed: Jun. 23, 2016

(65) Prior Publication Data
US 2017/0006215 A1     Jan. 5, 2017

(30) Foreign Application Priority Data

Jun. 30, 2015   (AU) ................................. 2015203666

(51) Int. Cl.
 *H04N 7/18*   (2006.01)
 *H04N 5/232*  (2006.01)
 (Continued)

(52) U.S. Cl.
 CPC ..... *H04N 5/23219* (2013.01); *G06K 9/00255* (2013.01); *G06K 9/00771* (2013.01);
 (Continued)

(58) Field of Classification Search
 CPC ........ H04N 7/185; H04N 7/181; H04N 7/183; H04N 5/23241; H04N 5/23219; H04N 5/23203; H04N 5/23222; H04N 5/23296; H04N 5/247; H04N 7/18; H04N 5/232; G06T 7/246; G06T 7/73;
 (Continued)

(56) References Cited

U.S. PATENT DOCUMENTS 7,792,598 B2   9/2010   Khosla
7,917,332 B2   3/2011   Waldock
(Continued)

OTHER PUBLICATIONS

Sommerlade, Eric, et al. Gaze Directed Camera Control for Face Image Acquisition in ICRA, Proceedings from IEEE International Conference on Robotics and Automation, 2011; IEEE: May 2011; p. 4227-4233.
(Continued)

*Primary Examiner* — Sherrie Hsia
(74) *Attorney, Agent, or Firm* — Canon U.S.A., Inc. IP Division

(57) ABSTRACT

Methods, systems, and computer readable media are described for controlling a camera to perform a selected task from a set of tasks is provided. The method comprises determining a viewing condition of the camera to perform each task from the set of tasks, and determining a posterior probability of task success for each task from the set of tasks based on the determined viewing conditions and a prior probability of task success for each task. The method also includes determining a change in rate of information gain for task success for each task from the set of tasks based on the posterior probability, selecting the task to be performed based on the change in rate of information gain, and controlling the camera to perform the selected task.

20 Claims, 13 Drawing Sheets

(51) Int. Cl.
  G06K 9/00 (2006.01)
  G08B 13/194 (2006.01)
  H04N 5/247 (2006.01)
  G06T 7/73 (2017.01)
  G06T 7/246 (2017.01)
  *G06F 3/02* (2006.01)
  *G06F 3/033* (2013.01)

(52) U.S. Cl.
  CPC .............. G06T 7/246 (2017.01); G06T 7/73 (2017.01); G08B 13/194 (2013.01); H04N 5/23203 (2013.01); H04N 5/23222 (2013.01); H04N 5/23296 (2013.01); H04N 5/247 (2013.01); *G06F 3/02* (2013.01); *G06F 3/033* (2013.01); *G06T 2207/30201* (2013.01)

(58) Field of Classification Search
  CPC ...... G06T 2207/30201; G06K 9/00255; G06K 9/00771; G08B 13/194; G06F 3/02; G06F 3/033
  USPC ................................ 348/159, 143, 152–156
  See application file for complete search history.

(56) References Cited

U.S. PATENT DOCUMENTS

2016/0184469 A1* 6/2016 Welch .................... H04N 7/183
                                                            348/143
2017/0178345 A1* 6/2017 Pham .................... G06T 7/2093

OTHER PUBLICATIONS

Faisal Z. Qureshi, et al. Planning ahead for PTZ camera assignment and handoff. In Planning ahead for PTZ camera assignment and handoff, Proceedings from Third ACM/IEEE International Conference on Distributed Smart Cameras (ICDSC), Como, Italy, Aug. 2009; ACM/IEEE: USA, Aug. 2009; p. 1-8.

Nils Krahnstoever, et al. Collaborative Real-Time Control of Active Cameras in Large Scale Surveillance Systems. In Proc. Workshop on Multi-camera and Multi-modal Sensor Fusio Algorithms and Applications (M2SFA2), Springer: 2008.

Krahnstoever et al. (Assignee GE Global Research), Collaborative Real-Time Control of Active Cameras in Large Scale Surveillance Systems, Oct. 2008, ECCV Workshop on Multi-camera and Multi-modal Sensor Fusion Algorithms and Applications, Citx No. 559514.

Vaisenberg et al. (Assignee The University of California), Scheduling sensors for monitoring sentient spaces using an approximate POMDP policy, Feb. 2014, Pervasive and Mobile Computing, Citx No. 591684.

Natarajan et al. (Assignee National University of Singapore), Decision-theoretic approach to maximizing observation of multiple targets in multi-camera surveillance, Jun. 2012, 11th International Conference on Autonomous Agents and Multiagent Systems, Citx No. 591685.

A. Hampapur et al. "Face cataloguer: Multi-scale imaging for relating identify to location". In Proceedings of the IEEE Conference on Advanced Video and Signal Based Surveillance (AVSS), Washington D.C., p. 13-21, Jul. 2003.

A.D. Bimbo et al. "Towards on-line saccade planning for high-resolution image sensing". Journal Pattern Recognition Letters, vol. 27, issue 15, p. 1826-1834, Nov. 2006. (CITX591802).

* cited by examiner

METHODS AND SYSTEMS FOR CONTROLLING A CAMERA TO PERFORM A TASK

REFERENCE TO RELATED PATENT APPLICATION(S)

This application claims the benefit under 35 U.S.C. § 119 of the filing date of Australian Patent Application No. 2015203666, filed 30 Jun. 2015 hereby incorporated by reference in its entirety as if fully set forth herein.

TECHNICAL FIELD

The present disclosure relates generally to image processing and, in particular, to a method, system and apparatus for controlling a camera for target image acquisition. The present disclosure also relates to a computer program product including a computer readable medium having recorded thereon a computer program for controlling a camera to capture target images.

BACKGROUND

Public venues such as shopping centres, parking lots and train stations are increasingly subject to surveillance with large-scale networks of video cameras. Application domains of large-scale video surveillance include security, safety, traffic management and business analytics.

Most commercially available surveillance camera systems rely primarily on static cameras for object detection and tracking. These static cameras generally have wide field-of-view, typically between 80 and 100 degrees, with a resolution limited to about 1920×1080 pixels even for high-end cameras. This limited resolution makes tasks that are sensitive to resolution and image quality, such as face detection, face recognition, forensic examinations, and person re-identification using soft-biometrics, very difficult, especially where subjects are imaged from a distance. This issue has led to the extensive use of pan-tilt-zoom (PTZ) cameras for operator-based security applications as PTZ cameras can obtain close-up imageries of subjects.

One major challenge for large-scale surveillance networks with a limited number of PTZ cameras is camera scheduling, which is the problem of computing an optimal set of camera assignments for satisfying multiple different types of tasks. For surveillance applications, one such task is to capture high quality image of all objects in the environment. For person identification, the tasks also include capturing frontal face images of all human targets. Another task is to detect suspicious target activities by persistently tracking identified targets. Yet another example is to monitor doorways of secure areas.

In the following discussion, the term "camera scheduling" will be understood to include the terms "camera assignment" and "camera planning".

Camera scheduling is a challenging problem for several reasons. Human motion is highly stochastic in nature. The targets should ideally be captured at a viewing condition suitable for a given task. As an example, for person identification, high quality frontal face images are desired. Alternatively, for behaviour analysis, the profile view of a suspicious target may be preferred. However, public venues are often characterized by crowds of uncooperative targets moving in uncontrolled environments with varying and unpredictable distance, speed and orientation relative to the camera. Furthermore, high object coverage is usually required in a surveillance camera network, where the number of cameras is usually far less than the number of subjects in the scene. Also, depending on the specific application, a surveillance system may be required to satisfy multiple different types of tasks. For example, the system may need to simultaneously capture frontal face images for all targets and persistently track suspicious tagged targets. In addition, the scheduling algorithm may need to operate optimally with varying number of PTZ cameras. For example, it should be easy to add a new PTZ camera to the network due to network reconfiguration.

One known method for camera scheduling assigns cameras to targets sequentially in a round-robin fashion to achieve uniform coverage. This approach tends to have long execution time and a high miss rate.

Another method formulates the scheduling problem for a single PTZ camera as a Kinetic Travelling Salesperson Problem and ranks the targets by estimated deadlines i.e., by when the targets leave the surveillance area. An optimal subset of the targets, which satisfies the deadline constraint, is obtained through an exhaustive search. The main disadvantage of this approach is that it cannot be easily extended to multiple camera scenarios.

The above disadvantage is addressed in another method as a combinatorial search problem by finding a plan that fits into a given time horizon while maximising a heuristically defined reward function based on target-camera distance, frontal viewing direction, and PTZ limits. A greedy best-first-search strategy is used to find a good target-camera assignment in real-time given a pre-defined time budget for planning. However, the above method works more optimally when the time horizon is large and is generally slow to react to new targets.

Another related method solves the camera scheduling problem based on Markov decision processes. This approach attempts to find a situation-action mapping (called policy) that specifies the best action to take for each situation under uncertainty. The framework explicitly models the temporal evolution of states of the targets and designs a policy for action selection based on a reward function. This approach requires setup time for generating a situation-action mapping for a scene and does not work for continuous state space. Moreover, a new situation-action mapping needs to be re-computed every time a PTZ camera is added or removed from a camera network.

Yet another method uses gaze estimates from a static camera to optimise the control of active cameras with the aim of maximising the likelihood of surveillance targets being correctly identified. The method maintains a latent variable, for each target, representing whether the identity of a target is ascertained. Moreover, the method measures the expected information gain with respect to an image gallery from observing each target based on the gaze estimates, field-of-view of the PTZ cameras and the performance of identification process, and subsequently selects the target-camera assignment that gives the largest information gain. This method avoids repeat observations for identified targets, and hence captures more targets in an environment. However, the method requires a person of interest to be known in advance, and accordingly cannot be used to capture faces for offline search.

All of the above camera scheduling methods suffer from at least one of the following disadvantages: 1) identity of targets are required to be known in advance; 2) poor scalability to cope with new targets or new configuration of the camera network; and 3) difficult to extend to meet multiple different types of tasks simultaneously. As noted previously, practical applications thus present unfavourable conditions for known camera scheduling methods.

SUMMARY

It is an object of the present invention to substantially overcome, or at least ameliorate, one or more disadvantages of existing arrangements.

According to one aspect of the present disclosure, a method for controlling a camera to perform a selected task from a set of tasks is provided. The method comprises determining a viewing condition of the camera to perform each task from the set of tasks; determining a posterior probability of task success for each task from the set of tasks based on the determined viewing conditions and a prior probability of task success for each task; determining a change in rate of information gain for task success for each task from the set of tasks based on the posterior probability; selecting the task to be performed based on the change in rate of information gain; and controlling the camera to perform the selected task.

According to another aspect of the present disclosure, a method for controlling a PTZ camera to capture frontal face images of one or more human targets in a monitored area is provided. The method comprises determining a first probability that at least one frontal face image exists for each target; predicting a viewing condition of each target if the PTZ camera is controlled to capture a new image of each target; determining a second probability of capturing at least one facial image of each target if the PTZ camera is controlled to capture the new image of the target, based on the determined viewing condition; and controlling the PTZ camera to capture the frontal face image of a selected target based on the determined first probability and second probability.

According to another aspect of the present disclosure a computer readable medium is provided comprising instructions executable on a processor for controlling a camera to perform a selected task from a set of tasks. The instructions when executed on the processor perform the steps of: determining a viewing condition of the camera to perform each task from the set of tasks; determining a posterior probability of task success for each task from the set of tasks based on the determined viewing conditions and a prior probability of task success for each task; determining a change in rate of information gain for task success for each task from the set of tasks based on the posterior probability; selecting the task to be performed based on the change in rate of information gain; and controlling the camera to perform the selected task.

According to yet another aspect of the present disclosure, a computer readable medium is provided comprising instructions executable on a processor for controlling a PTZ camera to capture frontal face images of one or more human targets in a monitored area. The instructions when executed on the processor perform the steps of: determining a first probability that at least one frontal face image exists for each target; predicting a viewing condition of each target if the PTZ camera is controlled to capture a new image of each target; determining a second probability of capturing at least one facial image of each target if the PTZ camera is controlled to capture the new image of the target, based on the determined viewing condition; and controlling the PTZ camera to capture the frontal face image of a selected target based on the determined first probability and second probability.

According to yet another aspect of the present disclosure, a system for controlling a camera to perform a selected task from a set of tasks is provided. The system includes a memory for storing data and a computer program and a program coupled to the memory for executing the computer program. The computer program includes instructions for: determining a viewing condition of the camera to perform each task from the set of tasks; determining a posterior probability of task success for each task from the set of tasks based on the determined viewing conditions and a prior probability of task success for each task; determining a change in rate of information gain for task success for each task from the set of tasks based on the posterior probability; selecting the task to be performed based on the change in rate of information gain; and controlling the camera to perform the selected task.

According to yet another aspect of the present disclosure, a system is provided for controlling a PTZ camera to capture frontal face images of one or more human targets in a monitored area. The system includes a memory for storing data and a computer program, and a program coupled to the memory for executing the computer program. The computer program comprising instructions for: determining a first probability that at least one frontal face image exists for each target; predicting a viewing condition of each target if the PTZ camera is controlled to capture a new image of each target; determining a second probability of capturing at least one facial image of each target if the PTZ camera is controlled to capture the new image of the target, based on the determined viewing condition; and controlling the PTZ camera to capture the frontal face image of a selected target based on the determined first probability and second probability.

BRIEF DESCRIPTION OF THE DRAWINGS

One or more embodiments of the invention will now be described with reference to the following drawings, in which.

DETAILED DESCRIPTION

The present disclosure relates to methods for controlling one or more cameras to perform selected tasks from a set of tasks. The tasks may include capturing a frontal face image of a target in a monitored area, capturing a close-up image of a target in a monitored area, or persistently tracking a target. The methods and systems described herein select the particular task (such as capturing a frontal face image of a particular target) that has the maximum increase in rate of information gain between frames.

Previously known techniques for controlling a camera to perform a task selected from a set of tasks require advance knowledge of targets, face difficulty in coping with different tasks simultaneously, or have problems with new camera network configurations. Consequently, existing methods may perform poorly when the identity of a target is unknown or when they are required to perform multiple tasks simultaneously. For instance, conventional systems may perform poorly when they are required to capturing frontal face images of unknown shoppers in a shopping centre and at the same time scale well with additional PTZ cameras and persistently track a suspicious target.

The methods described in the present disclosure overcomes one or more of the above-mentioned limitations by computing a likelihood of task success over all tasks in a monitored area and computing an optimal camera assignment based on the highest computed likelihood of task success before and after the desired camera actions.

Figure 1:
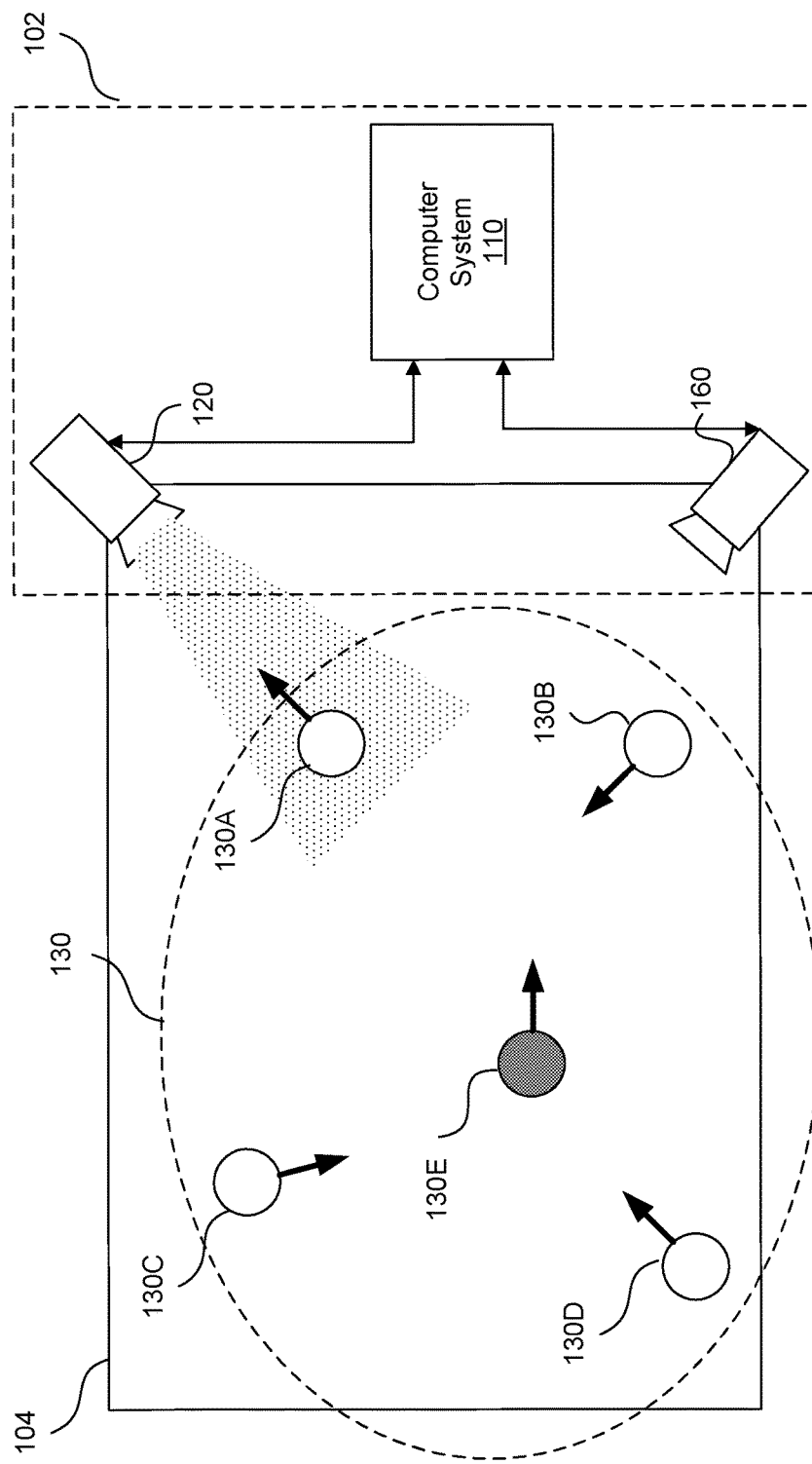
FIG. 1 is a schematic plan view of a monitored area.

Aspects of the present disclosure may be applied to monitor public venues such as shopping centres, parking lots, and train stations. FIG. 1 illustrates a schematic diagram of an exemplary environment 104 to which aspects of the present disclosure may be applied. Particularly, FIG. 1 illustrates a plan view of an area 104 monitored by a surveillance system 102. The monitored area 104 includes targets 130A, 130B, 130C, 130D and 130E (collectively referred to as targets 130) which are represented by a circle with an arrow denoting the face orientation of the target.

The surveillance system 102 may be configured to perform multiple tasks. For instance, the surveillance system 102 may be configured to monitor the area 104, capture and store close-up images of inanimate targets, capture and store frontal face images of human targets, or persistently track suspicious targets. To that end, the surveillance system 102 includes one or more wide field-of-view passive cameras 160, one or more Pan Tilt Zoom (PTZ) cameras 120, and a computer system 110. The computer system 110 receives inputs from the cameras 120 and 160 and in turn controls the movements of the cameras 120 and 160 to perform selected tasks. The received inputs may include captured frames of the area 104 and frontal face images of the targets 130.

In one example, an administrator/security guard may manually select the targets of interest. In another example, the computer 110 may automatically identify the targets of interest based on behaviour analysis.

The passive cameras 160 may have a field of view (FOV) that covers the entire area 104. In one embodiment, a single passive camera 160 may be employed that covers the entire area 104, while in other aspects, multiple passive cameras 120 and 160, may be utilized, where each passive camera covers a portion of the area 104. By processing the information jointly from all passive cameras 120 and 160, the surveillance network 102 may obtain complete coverage of the monitored area 104. The passive camera 160 may be configured to capture frames of the area 104 and transmit the captured frames to the computer system 110.

In yet another aspect, the surveillance network 102 may include only PTZ cameras 120. In this aspect, the coverage of the area 104 is accomplished by dynamically assigning a subset of PTZ cameras 120 to play the role of passive cameras 160 and maximising their field-of-view.

The PTZ cameras 120 may be configured to capture and transmit close-up images of targets in the area 104 to the computer system 110 depending on camera settings, such as pan, tilt and zoom values. The PTZ camera 120 is described by a tuple $\langle o, \emptyset, \theta, z \rangle_j$, where o is the 3D position the PTZ camera, $\emptyset$ and $\theta$ represent pan and tilt angles, and z is the zoom distance to a target from the camera 120. The PTZ camera 120 zooms into a target under the pan limits ($\emptyset_{min}$, $\emptyset_{max}$), with pan speed $\emptyset_{speed}$, under the tilt limits ($\theta_{min}$, $\theta_{max}$), with tilt speed $\theta_{speed}$ and under the zoom limits ($z_{min}$, $z_{max}$) with zoom speed $z_{speed}$ of the camera.

The surveillance system 102 may be part of a larger network observing a larger area or multiple different areas. For instance, the larger network may monitor the area inside a train station and immediately outside the train station.

While the examples in the following description mostly relate to surveillance tasks of monitoring human targets, the methods of the present disclosure may be equally applied to other types of targets. For instance, the method may be applied to capture vehicle number plates and persistently track a suspicious vehicle. Alternatively, the methods may be utilized to capture high-resolution images of luggage and persistently track movement of a suspicious looking baggage item. Those in the art will also recognize that embodiments of the methods described in the present disclosure may be applied to different types of sensors including conventional image or video cameras, infra-red cameras, radar, or acoustic sensors. For example, the method may be used to control the orientation and zoom of a PTZ camera to obtain close-up images of objects and human targets. Alternatively, the surveillance method may employ a high resolution static camera (40M pixels). In such a case, instead of controlling a PTZ camera, the method may be used to select a local image region of a full-size image for further processing.

Figure 12A:
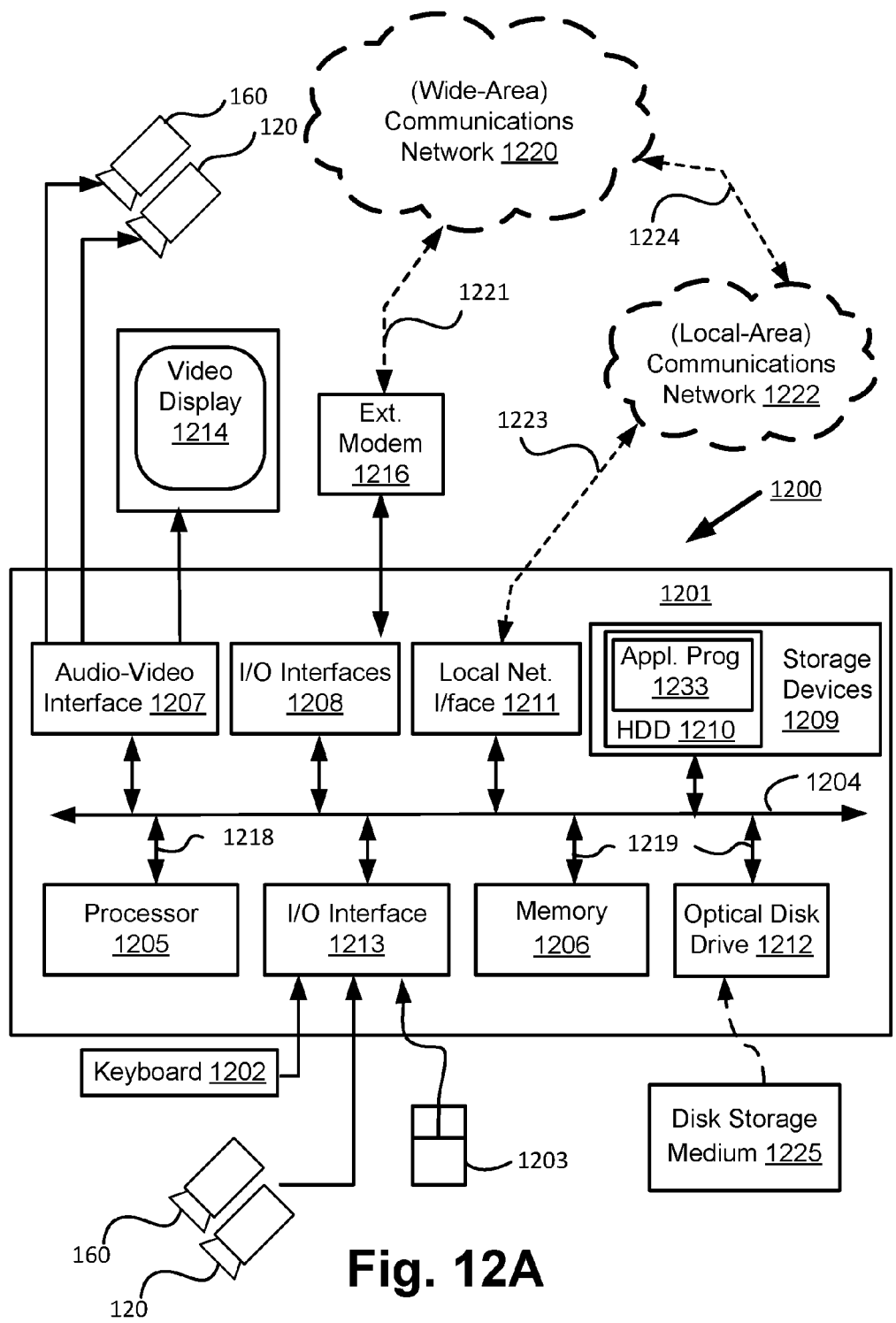
FIGS. 12A and 12B form a schematic block diagram of a general-purpose computer system with which the presently disclosed methods to control a camera may be practised.
Figure 12B:
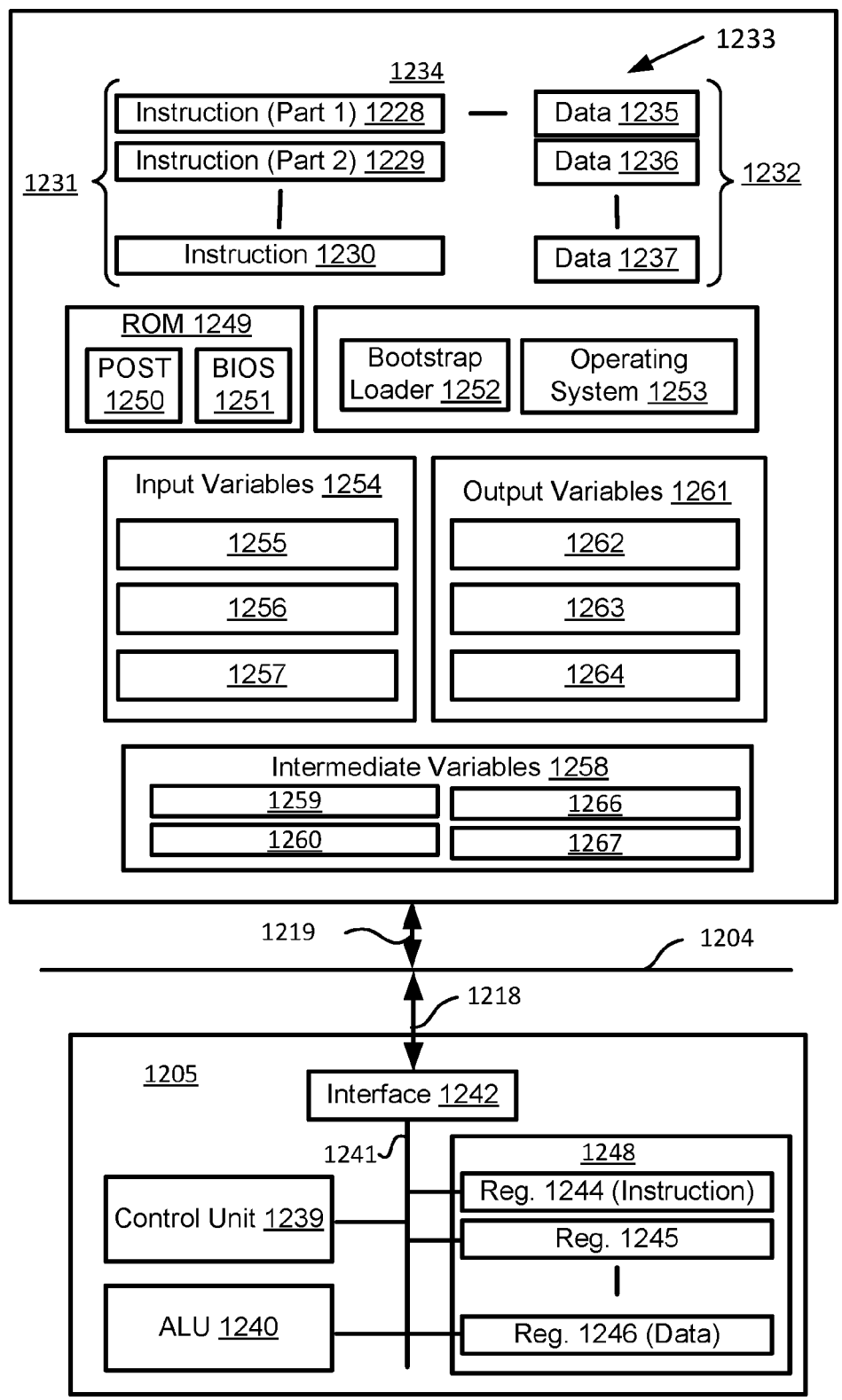

FIGS. 12A and 12B depict the computer system 110, upon which the various methods described in the present disclosure can be practiced. As seen in FIG. 12A, the computer system 110 includes: a computer module 1201; input devices such as the cameras 120 and 160, a keyboard 1202, or a mouse pointer device 1203; and output devices such as a display device 1214 and cameras 120, 160.

An external Modulator-Demodulator (Modem) transceiver device 1216 may be used by the computer module 1201 for communicating to and from cameras 120, 160 over a communications network 1220 via a connection 1221. The communications network 1220 may be a wide-area network (WAN), such as the Internet, a cellular telecommunications network, or a private WAN. Where the connection 1221 is a telephone line, the modem 1216 may be a traditional "dial-up" modem. Alternatively, where the connection 1221 is a high capacity (e.g., cable) connection, the modem 1216 may be a broadband modem. A wireless modem may also be used for wireless connection to the communications network 1220.

The computer module 1201 typically includes at least one processor unit 1205, and a memory unit 1206. For example, the memory unit 1206 may have semiconductor random access memory (RAM) and semiconductor read only memory (ROM). The computer module 1201 also includes any number of input/output (I/O) interfaces including: an audio-video interface 1207 that couples to the video display 1214 and the cameras 120, 160; an I/O interface 1213 that couples to the keyboard 1202, and mouse 1203 and optionally a joystick or other human interface device (not illustrated); and an interface 1208 for the external modem 1216. In some implementations, the modem 1216 may be incorporated within the computer module 1201, for example within the interface 1208. The computer module 1201 also has a local network interface 1211, which permits coupling of the computer system 110 via a connection 1223 to a local-area communications network 1222, known as a Local Area Network (LAN). As illustrated in FIG. 12A, the local communications network 1222 may also couple to the wide network 1220 via a connection 1224, which would typically include a so-called "firewall" device or device of similar functionality. The local network interface 1211 may comprise an Ethernet circuit card, a Bluetooth® wireless arrangement or an IEEE 802.11 wireless arrangement; however, numerous other types of interfaces may be practiced for the interface 1211.

The I/O interfaces 1208 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 1210. Other storage devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 110. The components 1205 to 1213 of the computer module 1201 typically communicate via an interconnected bus 1204 and in a manner that results in a conventional mode of operation of the computer system 110 known to those in the relevant art. For example, the processor 1205 is coupled to the system bus 1204 using a connection 1218. Likewise, the memory 1206 and optical disk drive 1212 are coupled to the system bus 1204 by connections 1219. Examples of computers on which the described arrangements can be practised include IBM-PC's and compatibles, Sun Sparcstations, Apple Mac™ or a like computer systems.

The methods 200, 300, 400, 600, 800, 900, 1000 and 1100 may be implemented using the computer system 110 wherein the processes of FIGS. 2-4, 6, and 8-11, to be described, may be implemented as one or more software application programs 1233 executable within the computer system 110. In particular, the steps of the methods are effected by instructions 1231 (see FIG. 12B) in the software 1233 that are carried out within the computer system 110. The software instructions 1231 may be formed as one or more code modules, each for performing one or more particular tasks. The software may also be divided into two separate parts, in which a first part and the corresponding code modules performs the methods and a second part and the corresponding code modules manage a user interface between the first part and the user.

The software may be stored in a computer readable medium, including the storage devices described below, for example. The software is loaded into the computer system 110 from the computer readable medium, and then executed by the computer system 110. A computer readable medium having such software or computer program recorded on the computer readable medium is a computer program product. The use of the computer program product in the computer system 110 preferably effects an advantageous apparatus for implementing the methods 200, 300, 400, 600, 800, 900, 1000 and 1100.

The software 1233 is typically stored in the HDD 1210 or the memory 1206. The software is loaded into the computer system 110 from a computer readable medium, and executed by the computer system 110. Thus, for example, the software 1233 may be stored on an optically readable disk storage medium (e.g., CD-ROM) 1225 that is read by the optical disk drive 1212. A computer readable medium having such software or computer program recorded on it is a computer program product. The use of the computer program product in the computer system 110 preferably effects an apparatus for practicing the methods 200, 300, 400, 600, 800, 900, 1000 and 1100.

In some instances, the application programs 1233 may be supplied to the user encoded on one or more CD-ROMs 1225 and read via the corresponding drive 1212, or alternatively may be read by the user from the networks 1220 or 1222. Still further, the software can also be loaded into the computer system 110 from other computer readable media. Computer readable storage media refers to any non-transitory tangible storage medium that provides recorded instructions and/or data to the computer system 110 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1201. Examples of transitory or non-tangible computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on websites and the like.

The second part of the application programs 1233 and the corresponding code modules mentioned above may be executed to implement one or more graphical user interfaces (GUIs) to be rendered or otherwise represented upon the display 1214. Through manipulation of typically the keyboard 1202 and the mouse 1203, a user of the computer system 110 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via a loudspeakers and user voice commands input via a microphone.

FIG. 12B is a detailed schematic block diagram of the processor 1205 and a "memory" 1234. The memory 1234 represents a logical aggregation of all the memory modules (including the Storage Devices 1209 and semiconductor memory 1206) that can be accessed by the computer module 1201 in FIG. 12A. When the computer module 1201 is initially powered up, a power-on self-test (POST) program 1250 executes. The POST program 1250 is typically stored in a ROM 1249 of the semiconductor memory 1206 of FIG. 12A. A hardware device such as the ROM 1249 storing software is sometimes referred to as firmware. The POST program 1250 examines hardware within the computer module 1201 to ensure proper functioning and typically checks the processor 1005, the memory 1234 (1209, 1206), and a basic input-output systems software (BIOS) module 1251, also typically stored in the ROM 1249, for correct operation. Once the POST program 1250 has run successfully, the BIOS 1251 activates the hard disk drive 1210 of FIG. 12A. Activation of the hard disk drive 1210 causes a bootstrap loader program 1252 that is resident on the hard disk drive 1210 to execute via the processor 1205. This loads an operating system 1253 into the RAM memory 1206, upon which the operating system 1253 commences operation. The operating system 1253 is a system level application, executable by the processor 1205, to fulfil various high level functions, including processor management, memory management, device management, storage management, software application interface, and generic user interface.

The operating system 1253 manages the memory 1234 (1209, 1206) to ensure that each process or application running on the computer module 1001 has sufficient memory in which to execute without colliding with memory allocated to another process. Furthermore, the different types of memory available in the system 110 of FIG. 12A must be used properly so that each process can run effectively. Accordingly, the aggregated memory 1234 is not intended to illustrate how particular segments of memory are allocated (unless otherwise stated), but rather to provide a general view of the memory accessible by the computer system 110 and how such is used.

As shown in FIG. 12B, the processor 1205 includes a number of functional modules including a control unit 1239, an arithmetic logic unit (ALU) 1240, and a local or internal memory 1248, sometimes called a cache memory. The cache memory 1248 typically includes a number of storage registers 1244-1246 in a register section. One or more internal busses 1241 functionally interconnect these functional modules. The processor 1205 typically also has one or more interfaces 1242 for communicating with external devices via the system bus 1204, using a connection 1218. The memory 1234 is coupled to the bus 1204 using a connection 1219.

The application program 1233 includes a sequence of instructions 1231 that may include conditional branch and loop instructions. The program 1233 may also include data 1232 which is used in execution of the program 1233. The instructions 1231 and the data 1232 are stored in memory locations 1228, 1229, 1230 and 1235, 1236, 1237, respectively. Depending upon the relative size of the instructions 1231 and the memory locations 1228-1230, a particular instruction may be stored in a single memory location as depicted by the instruction shown in the memory location 1230. Alternately, an instruction may be segmented into a number of parts each of which is stored in a separate memory location, as depicted by the instruction segments shown in the memory locations 1228 and 1229.

In general, the processor 1205 is given a set of instructions which are executed therein. The processor 1205 waits for a subsequent input, to which the processor 1205 reacts to by executing another set of instructions. Each input may be provided from one or more of a number of sources, including data generated by one or more of the input devices 1202, 1203, data received from an external source across one of the networks 1220, 1202, data retrieved from one of the storage devices 1206, 1209 or data retrieved from a storage medium 1225 inserted into the corresponding reader 1212, all depicted in FIG. 12A. The execution of a set of the instructions may in some cases result in output of data. Execution may also involve storing data or variables to the memory 1234. The disclosed methods use input variables 1254, which are stored in the memory 1234 in corresponding memory locations 1255, 1256, 1257. The disclosed methods produce output variables 1261, which are stored in the memory 1234 in corresponding memory locations 1262, 1263, 1264. Intermediate variables 1258 may be stored in memory locations 1259, 1260, 1266 and 1267.

Referring to the processor 1205 of FIG. 12B, the registers 1244, 1245, 1246, the arithmetic logic unit (ALU) 1240, and the control unit 1239 work together to perform sequences of micro-operations needed to perform "fetch, decode, and execute" cycles for every instruction in the instruction set making up the program 1233. Each fetch, decode, and execute cycle comprises:

1. a fetch operation, which fetches or reads an instruction 1231 from a memory location 1228, 1229, 1230;
2. a decode operation in which the control unit 1239 determines which instruction has been fetched; and
3. an execute operation in which the control unit 1239 and/or the ALU 1240 execute the instruction.

Thereafter, a further fetch, decode, and execute cycle for the next instruction may be executed. Similarly, a store cycle may be performed by which the control unit 1239 stores or writes a value to a memory location 1232.

Each step or sub-process in the processes of FIGS. 2, 3, 4, 6, and 8-11 is associated with one or more segments of the program 1233 and is performed by the register section 1244, 1245, 1246, the ALU 1240, and the control unit 1239 in the processor 1205 working together to perform the fetch, decode, and execute cycles for every instruction in the instruction set for the noted segments of the program 1233.

The disclosed methods may alternatively be implemented in dedicated hardware such as one or more integrated circuits performing the functions or sub functions. Such dedicated hardware may include graphic processors, digital signal processors, or one or more microprocessors and associated memories, and may reside on platforms such as cameras 120, 160.

In the present disclosure, camera scheduling may be solved by an information-theoretic approach. Aspects of the present disclosure will be described in detail with reference to a task of capturing at least one frontal face image for every target in a given scene. However, it will be understood that the methods described herein may equally be employed for other tasks, such as persistently tracking a suspicious person/item, or capturing high-resolution images of vehicle license plates, items, or interactions between groups of people, and so on without departing from the scope of the present disclosure.

Figure 2:
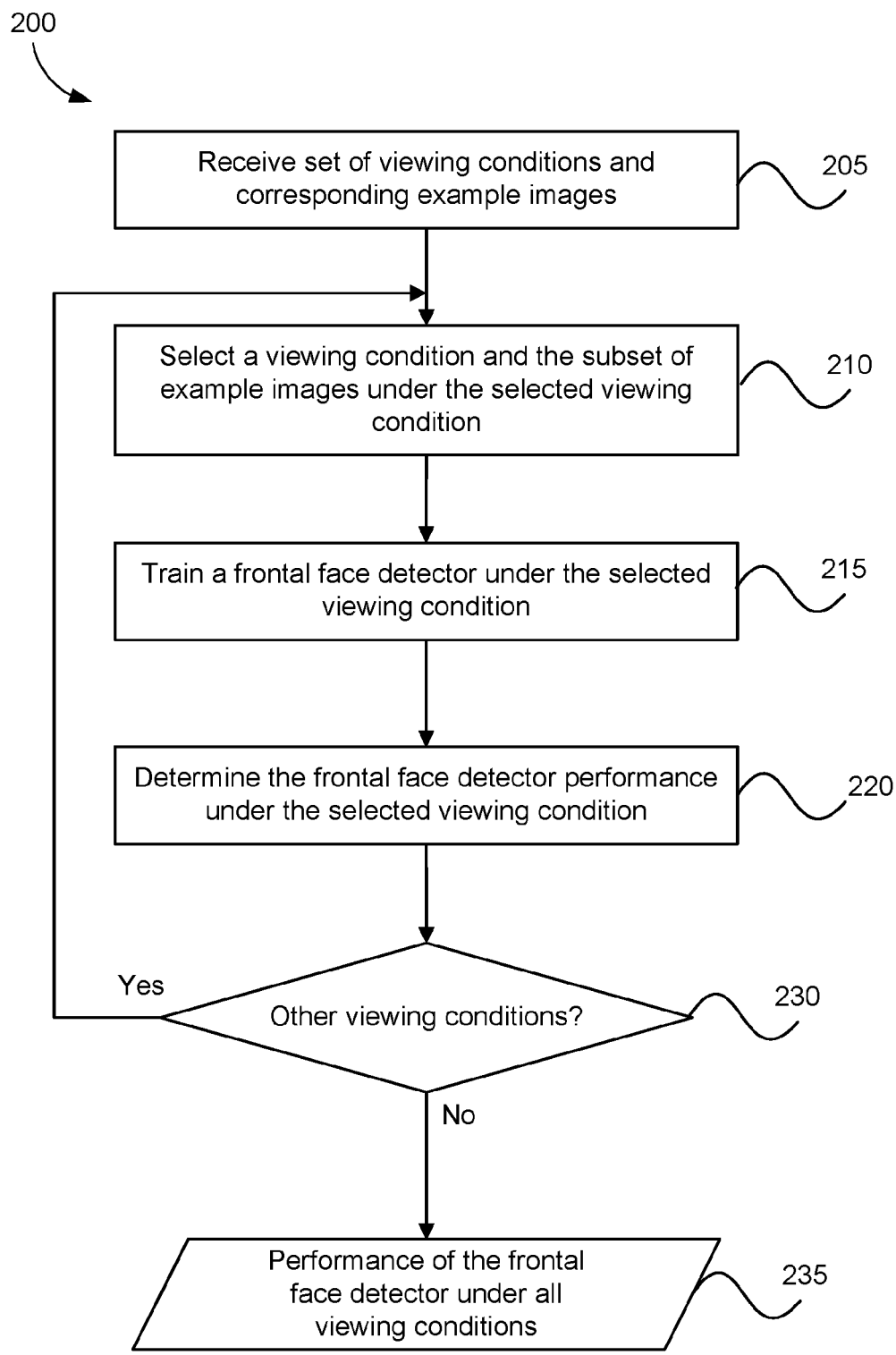
FIG. 2 is a schematic flow diagram illustrating a method of initialization for camera assignment.

FIG. 2 is a flowchart illustrating a method 200 of initializing a frontal face detector in the computer system 110. The frontal face detector is configured to detect if an image includes a frontal face of a target and it may be an application program 1233 or a module in an application program 1233 of the computer system 110.

Let x represent the current state of a task success. For face acquisition, $x=x^k$, $k=1, \ldots K$. In the following discussion, $x^k=1$ represents the state that at least one frontal face image of a given target is captured after $k^{th}$ target's observation, and $x^k=0$ represents the contrary. $f^k$, $k=1, \ldots K$ is a latent variable representing whether there is a frontal face in the $k^{th}$ target image. $f^k=1$ represents the state that there is a frontal face image in the $k^{th}$ target image, and $f^k=0$ represents the contrary. Let $d^k$, $k=1, \ldots K$ represent the output of the frontal face detector applied to the captured $k^{th}$ image. $d^k=1$ represents that the detector detects a frontal face image in the $k^{th}$ target image, and $d^k=0$ represents the contrary. Let $v^k$ represent the viewing condition of the PTZ camera with respect to the target when the $k^{th}$ target image is captured. The quality of the frontal face image varies with the viewing condition, such as the distance between the camera and the target, the focal length and resolution of the camera, and the orientation of the target relative to the camera.

Method 200 starts at step 205 where a set of viewing conditions $\{v_i\}$, i=1, 2, ... $N_v$ and a set of example frontal and non-frontal face images for each viewing condition are received as input. Each subset of example images may be captured by the PTZ camera 120 under a specific viewing condition in the set of viewing conditions and then stored in the memory 1234. In the example illustrated in FIG. 1, the viewing condition refers to the face orientation of the target with respect to the PTZ viewing angle. Alternatively, the viewing condition may refer to the distance of the target from the PTZ camera or the lighting condition of the area 104.

At step 210, a viewing condition $v_i$ and a subset of example images corresponding to the selected viewing condition are selected. In one example, the viewing condition may be selected based on pre-defined rules such as selecting the viewing condition in ascending order with respect to the value of relative face orientation. In another example, a viewing condition may be selected randomly from the set of unselected viewing conditions.

Subsequently, at step 215, the frontal face detector is trained on the selected example images. The frontal face detector is configured to decide whether the example images contain a frontal face or not. The frontal face detector is trained using a supervised machine learning method, based on a set of example images for each class label (frontal face image or not). In one embodiment, the frontal face detector is trained during an offline training phase, prior to executing method 400. In an alternative embodiment, the frontal face detector is updated online while executing method 400, for example based on feedback from a user about whether the image captured contains a frontal face or not. Any classification technique, such as support vector machine (SVM), decision tree, artificial neural network (ANN) or k-nearest neighbour (k-NN) matching may be utilized to detect frontal faces.

At step 220, the performance of the frontal face detector is determined under the selected viewing conditions $v_i$. In one aspect, the performance of the frontal face detector may be determined by testing the detector on a set of pre-labelled test images captured under a particular viewing condition $v_i$. The performance of the detector is then determined from the test results as follows: $p(d=1|f=1, v_i)$ takes the value of the true positive rate of the detector, $p(d=0|f=1, v_i)$ takes the value of the false negative rate of the detector, $p(d=1|f=0, v_i)$ takes the value of the false positive rate of the detector and finally $p(d=0|f=0, v_i)$ takes the value of the true negative rate of the detector.

Method 200 then proceeds to step 230, which determines if all viewing conditions from the set of viewing conditions are exhausted. If one or more viewing conditions have not been processed, the method loops back to 210 and the method 200 is repeated until all the viewing conditions are processed. If no additional viewing conditions remain, the method stops, and outputs the performance of the frontal face detector under all the pre-defined viewing conditions. In one embodiment, the performance of the frontal face detector 235 is stored in memory 1234.

Figure 3:
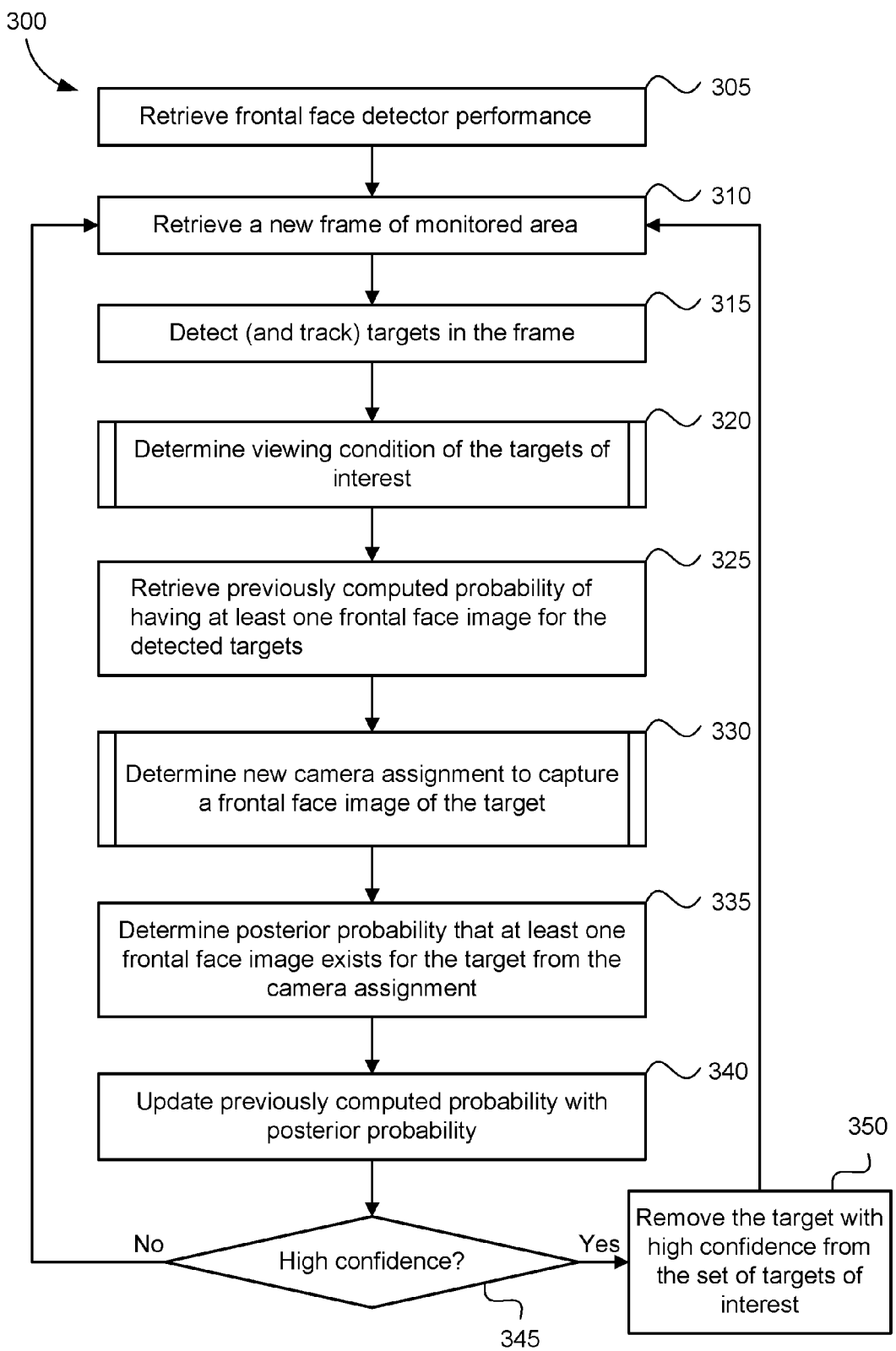
FIG. 3 is a flowchart illustrating a method for controlling a camera to capture at least one frontal face image for each target in a monitored area.

FIG. 3 is a flowchart illustrating a method 300 for controlling a camera to capture at least one frontal face for each target in an area. Method 300 is described with reference to targets 130 in the scene 104. At step 305, the frontal face detector performance $p(d^k|f^k, v^k)$ 235 is retrieved from the memory 1234. Subsequently, at step 310, a new frame (frame k) of the monitored area 104 captured by the passive camera 160 is received as an input.

Method 300 then proceeds to step 315, where all the targets 130 in the monitored area 104 captured in frame k at step 310 are detected and optionally tracked. Any one of the various known techniques may be utilized to detect the targets. For example, a target may be detected by performing foreground separation using a statistical background pixel modelling method such as Mixture of Gaussian (MoG), where the background model is maintained over multiple frames with a fixed camera setting. Alternatively, a foreground separation method may be performed on Discrete Cosine Transform blocks, or a foreground separation may be performed on an unsupervised segmentation of the frame by using superpixels. Other example techniques include detecting the target using a supervised machine learning method such as a part-based model or pedestrian detector. The pedestrian detector classifies a set of regions of interest as containing a pedestrian or not based on a training set of pedestrian exemplars.

In one aspect, the output of step 315 is one or more rectangular bounding boxes indicating regions of interest on the image plane that includes each target. Alternatively, the output of step 315 may be one or more rectangular bounding boxes indicating regions of interest on the image plane that includes the head regions of each target. In yet another aspect of the present disclosure, the output of step 315 may be a binary image map indicating which pixels belong to each target and which pixels belong to the background.

Target detection may optionally be followed by target tracking in order to associate observations of the same target over multiple frames. Various techniques are known for target tracking. Any one of these techniques may be utilized without departing from the scope of the present disclosure. For instance, naïve tracking may be performed by assuming Brownian motion and associating a candidate target in one frame to the candidate target at the nearest pixel location in a previous frame. Alternatively, tracking may be performed by estimating the motion of the target using a recursive Bayesian filter such as a Kalman filter or particle filter. Other example tracking techniques include using appearance information about the target in addition to positional and velocity information.

Figure 6:
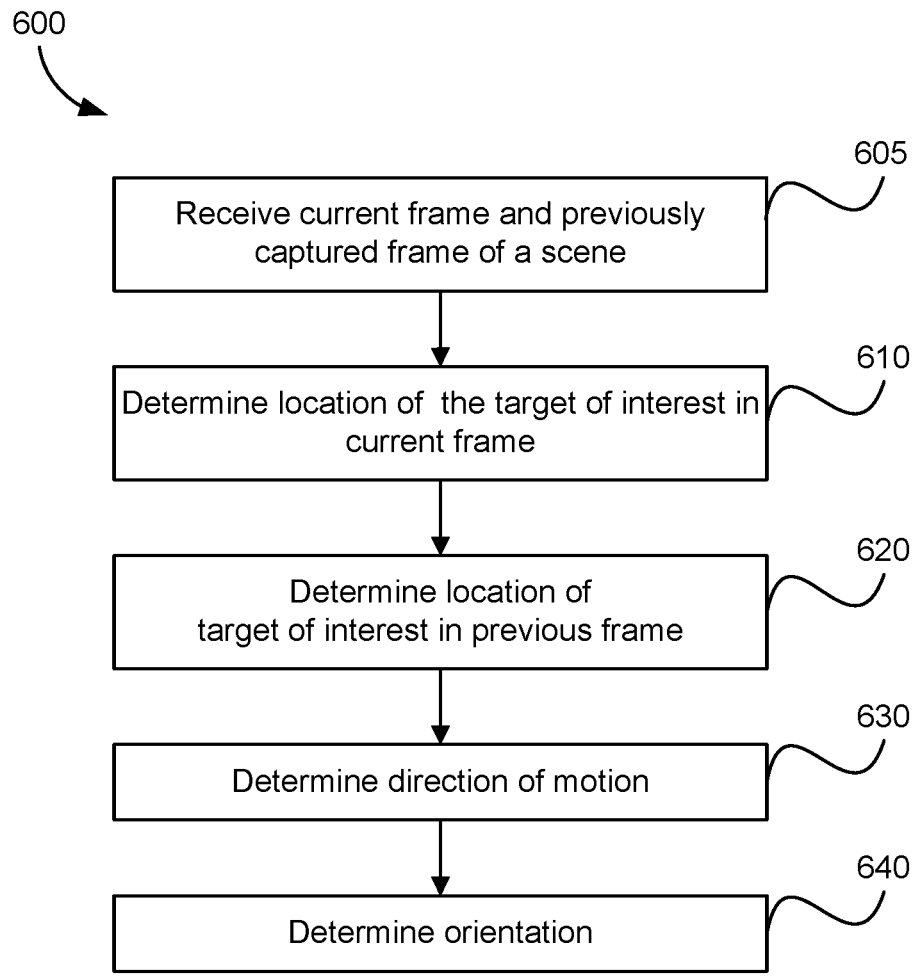
FIG. 6 is a flowchart illustrating a method for determining a travelling direction of a target.
Figure 7A:
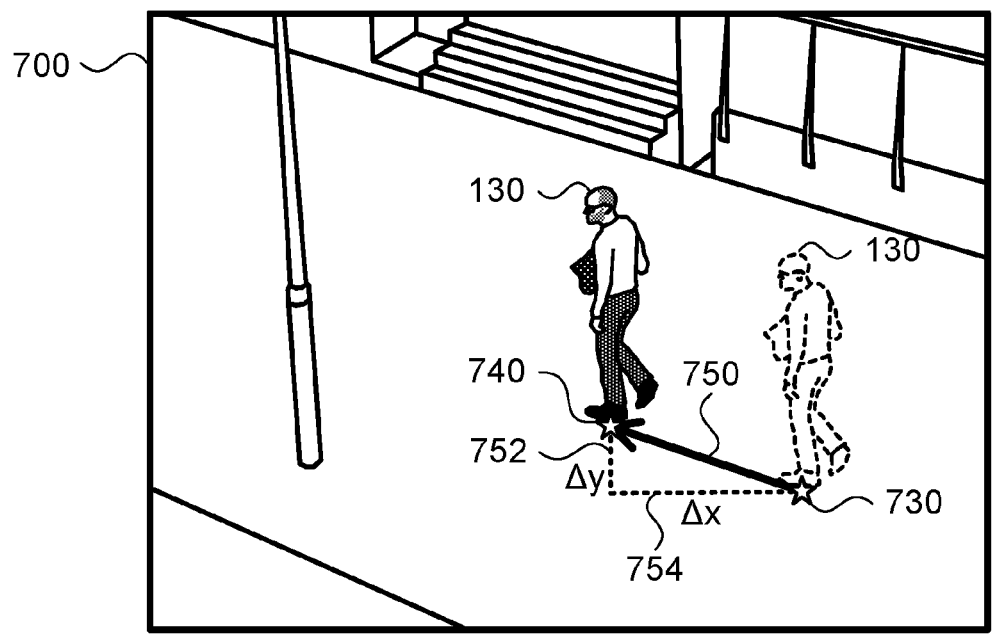
FIGS. 7A and 7B are schematic diagrams of a moving target according to one aspect of the present disclosure.
Figure 7B:
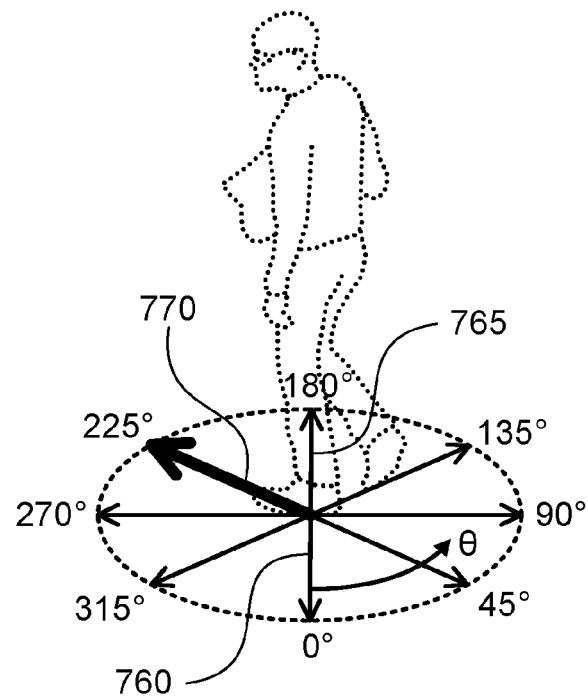

Method 300 subsequently proceeds to step 320, where the viewing conditions of each of the targets 130 in frame k are determined with respect to the viewpoint of the PTZ camera 120. As described previously, the viewing condition may be the distance between the camera and the target, the focal length and the resolution of the camera, the lighting conditions (for example, indoor or outdoor lighting), or the face orientation of the target with respect to the viewpoint of the PTZ camera 120. In one embodiment, the relative face orientation is determined using a machine learning approach to classify the facial image of the target into a set of discrete orientation classes (e.g. "front view", "profile view" and "rear view"). A classifier module is trained on a set of example images from each orientation class. In another embodiment, the relative face orientation is determined using model-based pose estimation to fit a model of the target to the image of the target, based on extracted features such as edges. In yet another embodiment, the relative face orientation is estimated based on the direction of motion of the target. This embodiment is illustrated in FIGS. 6, 7A and 7B, and will be described in more detail later.

At step 325, the method 300 retrieves the previously computed probability of having at least one frontal face image for the detected targets, denoted by $p(x^{k-1}|d^{k-1}, v^{k-1})$. In one embodiment, the probability that at least one frontal face image exists for a target from pervious observations is set to 0 ($p(x^0|d^0, v^0)=0$) before any frame is captured. The probability that at least one frontal face image exists from previous observations is updated from step 335 after a camera assignment is determined and a new observation is made.

Figure 8:
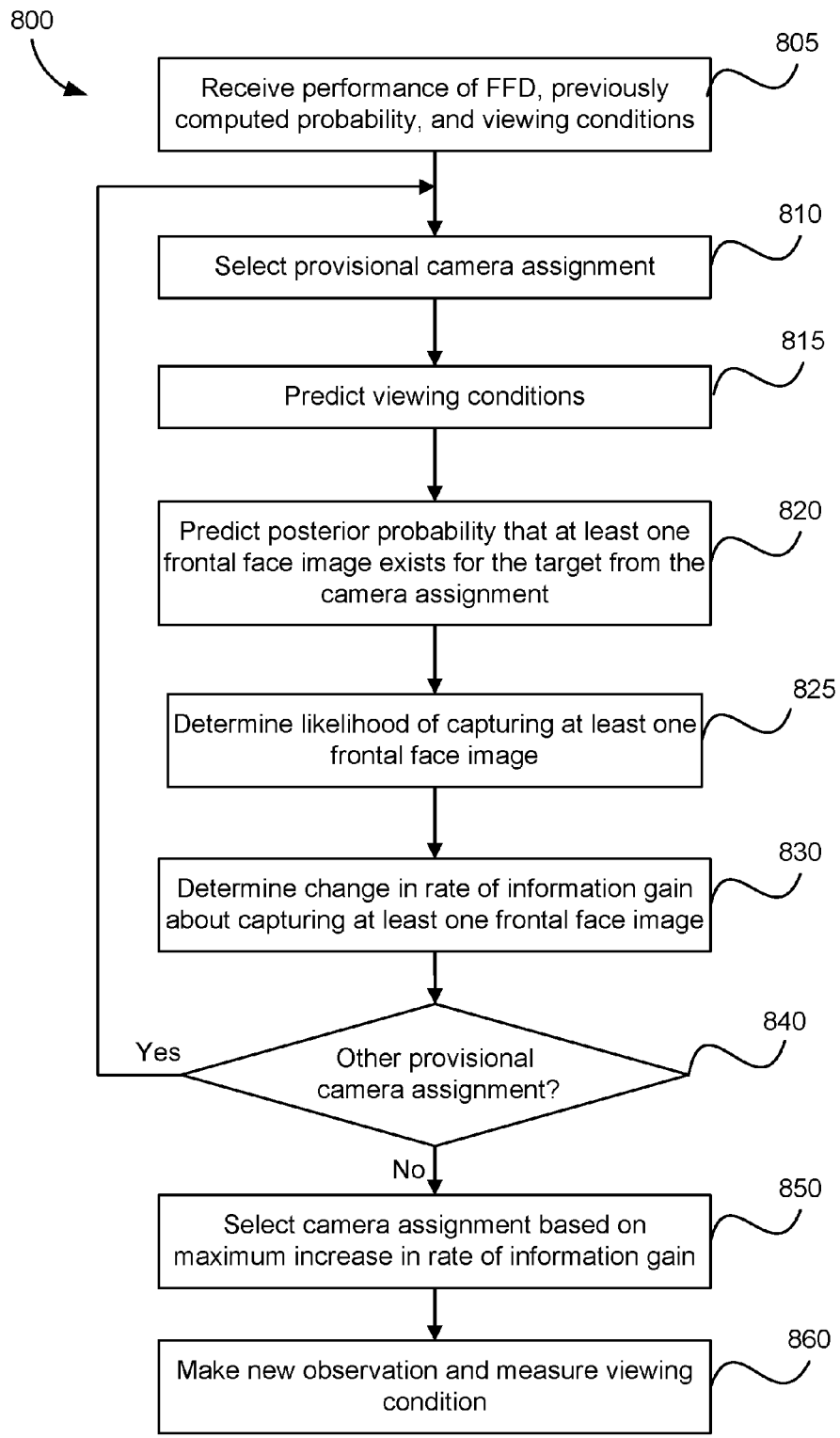
FIG. 8 is a flowchart illustrating a method for selecting a camera assignment according to one aspect of the present disclosure.

Method 300 then proceeds to step 330, where a new camera assignment is selected. In the case of a single PTZ camera 120, camera assignment refers to selection of a particular pan, tilt, and/or zoom value for capturing a particular target. In the example illustrated in FIG. 1, each target may have a corresponding camera assignment. In one embodiment, a numerical optimization such as an iterative descent search is performed to select the camera assignment that maximizes the increase in information for a particular task. Alternatively, a fixed set of camera assignments are generated based on predetermined rules, and the camera assignment that maximizes the increase in information for a task is selected. For example, the rules may generate camera assignments based on the relative orientation and position of the targets with respect to the camera. The output of step 330 in this embodiment is the assignment of the camera 120 to point to one target of interest to capture a frontal face image. Accordingly, the new observation $d^k$ is made and a new viewing condition $v^k$ is measured. This embodiment is illustrated in FIG. 8, and will be described in more detail later.

Method 300 then proceeds to step 335, which determines the posterior probability $p(x^k|d^k, v^k)$ that at least one frontal face image is captured for the selected target. The posterior probability is based on the probability of having at least one frontal face image of the captured target in the current frame and the probability of having at least one frontal face image from previous frames. In one embodiment, step 335 computes the posterior probability from a "Posterior Equation" defined in accordance with Equation (1).

$$p(x^k|d^k, v^k) = 1 - \prod_k (1 - p(f^k=1|d^k, v^k)) \quad (1)$$
$$= p(f^k=1|d^k, v^k) + p(x^{k-1}|d^{k-1}, v^{k-1}) -$$
$$p(f^k=1|d^k, v^k) * p(x^{k-1}|d^{k-1}, v^{k-1})$$

In Equation (1) above, the term $p(f^k|d^k, v^k)$ is determined based on the frontal face detector performance, represented by the confusion matrix $p(d^k|f^k, v^k)$ retrieved in step 305, as given by Equation (2):

$$p(f^k|d^k, v^k) = \frac{p(d^k|f^k, v^k)p(f^k|v^k)}{\Sigma_{f_k} p(d^k|f^k, v^k)p(f^k|v^k)} \quad (2)$$

In Equation (2) above, the term $p(f^k|v^k)$ represents the probability of capturing a frontal face of the target with the viewing condition $v^k$. $p(f^k|v^k)$ may be estimated by measuring the face orientation directly, and estimating the distribution of frontal face captures under viewing condition $v^k$ during an offline training phase from a collection of images where targets are captured under viewing condition $v^k$.

As an example, consider that the probability of having at least one frontal face image of a target in three previous frames, k-1, k-2, and k-3 is 0.3, 0.1, and 0.5 respectively. Then, the previously determined probability of having at least one face image is—

$P(\text{face})=1-(1-0.3)*(1-0.1)*(1-0.5)$ $P(\text{face})=1-(0.7*0.9*0.5)$ $P(\text{face})=0.69$ If the probability of having at least one frontal face image for the current frame k is 0.8, the posterior probability of having at least one face image after step 330 is—

$P(\text{face})=1-(1-0.3)*(1-0.1)*(1-0.5)*(1-0.8)$ $P(\text{face})=0.94$

Once the posterior probability is calculated, the previously computed probability of having at least one frontal face image of the specific target is updated at step 340 with the value of the posterior probability and the method proceeds to step 345, which determines whether at least one frontal face image is captured for the target selected from the camera assignment. In one embodiment, the method determines whether a frontal face image is captured by comparing the posterior probability determined at step 335 to an upper threshold, e.g. 0.95. If the posterior probability is above the upper threshold, then the confidence in capturing at least one frontal face is high. Otherwise, the confidence is low. If the confidence in capturing at least one frontal face is low, the method loops back to step 310, wherein a new frame of the monitored area 104 is received and the method is repeated. If the confidence in capturing at least one frontal face is high, the method proceeds to the step 350, where the target with high confidence is removed from the set of targets of interest, and no new camera assignment is made for the target. Control then loops back to step 310, wherein a new frame is obtained and the method is repeated. In another embodiment, the method loops back directly from step 340 to step 310 without the decision step 345 as a new frame is captured.

Figure 4:
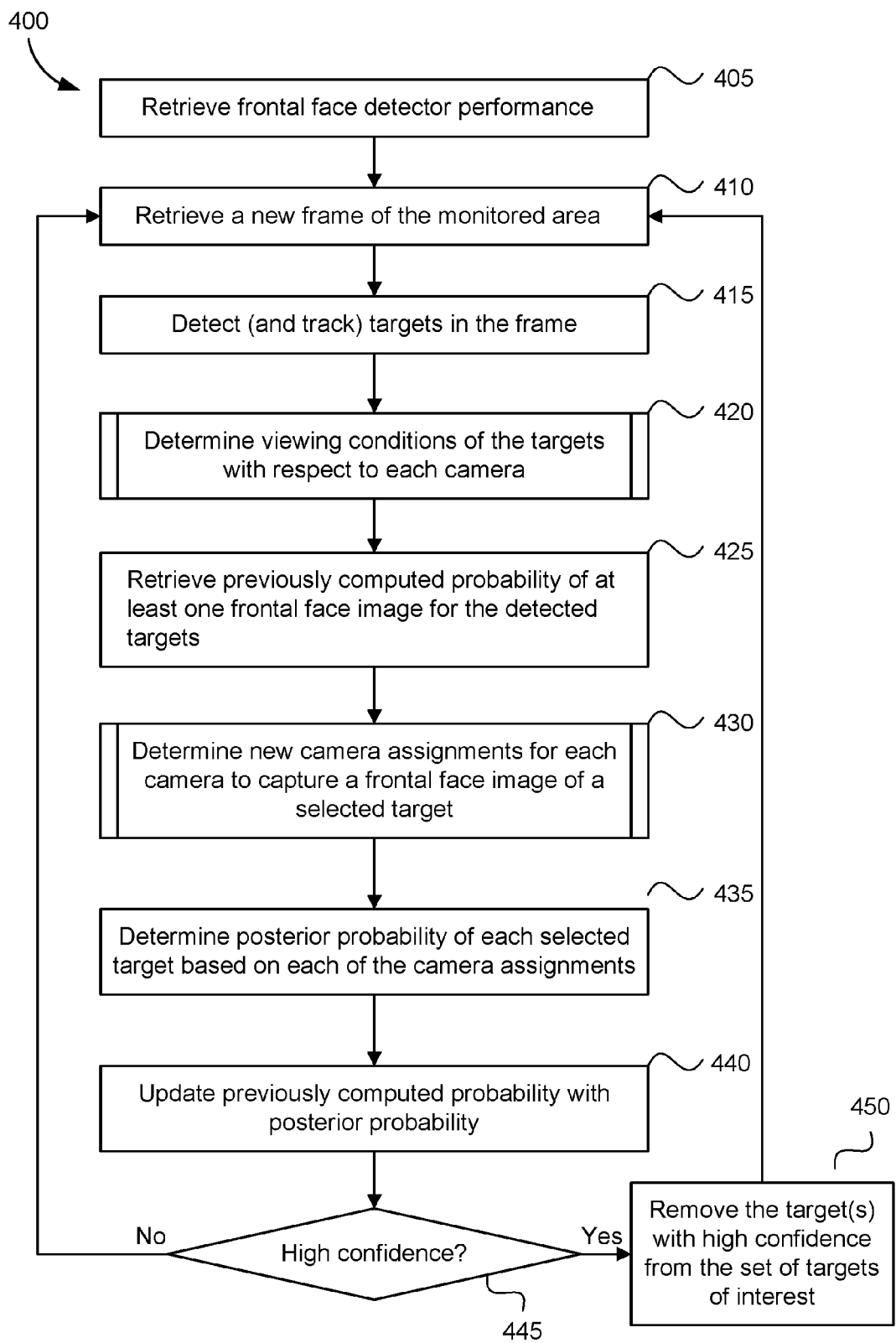
FIG. 4 is a flow chart illustrating a method for controlling multiple cameras to capture at least one frontal face image for each target in a monitored area.

FIG. 3 illustrates one aspect of a method for controlling a single PTZ camera to capture at least one frontal face image for each target of interest. It will be understood that variations of this method are also contemplated within the scope of the present disclosure. For instance, a camera assignment may be planned for multiple PTZ cameras in order to capture at least one frontal face image for each target of interest supposing each camera is independent of other cameras. FIG. 4 is a flowchart illustrating this variation. Steps 405-415 are similar to steps 305-315 of method 300. At step 420, the viewing conditions of the targets of interest with respect to all the PTZ cameras are determined. For instance, if there are two PTZ cameras A and B and 3 targets X, Y, and Z are detected in the frame k, then viewing conditions of X, Y and Z with respect to camera A, and viewing conditions of X, Y and Z with respect to camera B are determined.

In step 425, the previously computing probability of having at least one frontal face image for the detected targets is retrieved from the memory and at step 430 a new camera assignment is determined for all the cameras and the cameras make new observations on multiple targets of interest. At step 435, the posterior probability for each observed target is determined independently of other observed targets and the previously computed probability for the observed targets is updated at step 440.

Step 445 decides, for each observed targets independently, if at least one frontal face image is captured with high confidence. If the frontal face image is captured with high confidence, the method proceeds to step 450, where each target with high posterior probability is removed from the set of targets of interest. Subsequently, the method loops back to step 410. Alternatively, the method directly loops back to step 410.

Figure 5A:
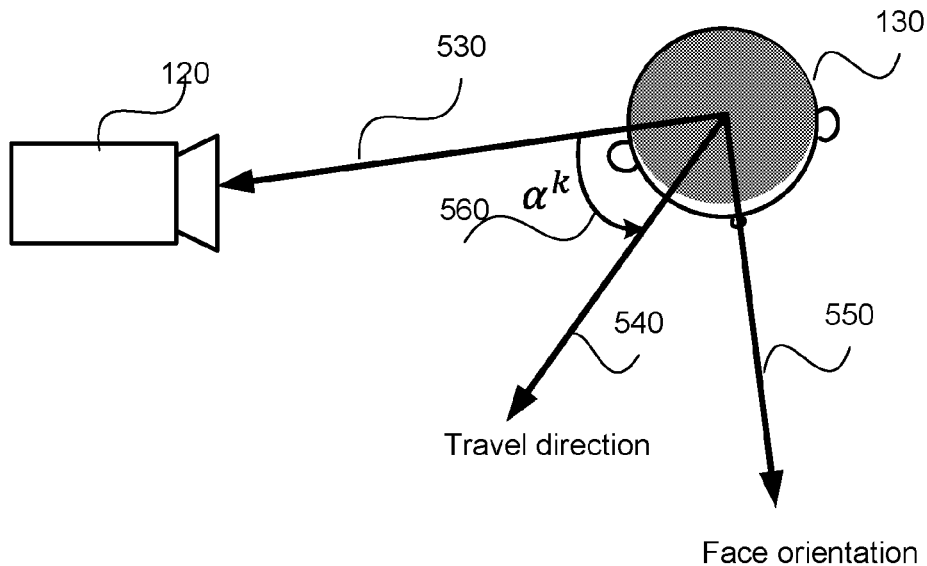
FIGS. 5A and 5B show an example of modelling the uncertainty of face orientation from the direction of travel of the target 130, according to one embodiment of the method of FIG. 3.

FIG. 5A is a schematic plan view of a viewing condition of the camera 120. More specifically, FIG. 5A is a plan view of a target 130 being monitored by the PTZ camera 120, depicting the direction in which the target 130 is facing 550 and the travelling direction 540 of the target 130 with respect to the camera 120. Furthermore, FIG. 6 illustrates an exemplary method 600 of determining a travelling direction of a target. The PTZ camera 120 monitors the target 130 along direction 530. The travel direction with respect to the camera-viewing angle, i.e., the angle between 530 and 540, is defined as the travel direction, and denoted by $\alpha^k$. The angle formed between the camera monitoring direction 530 and the direction of the target's face 550 is defined as the face orientation.

Figure 5B:
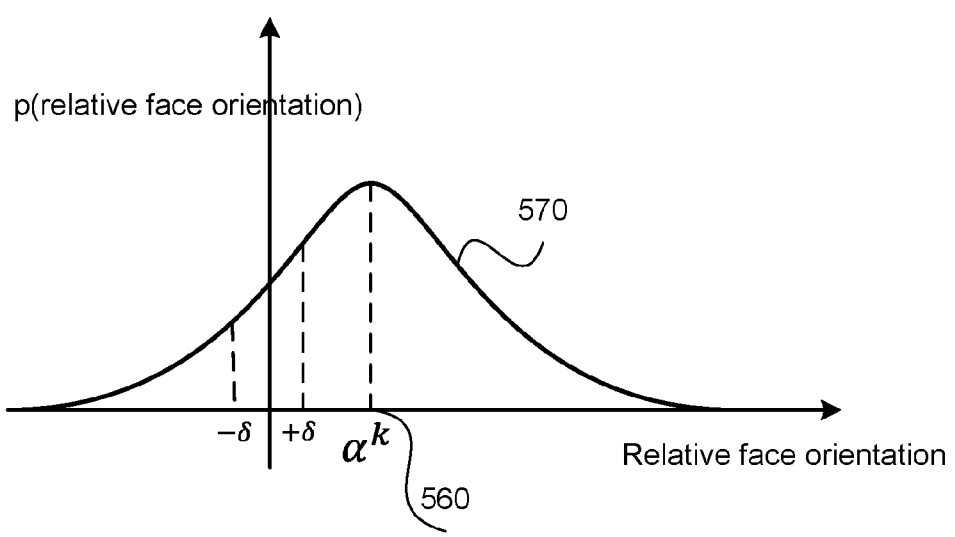

FIG. 5B is a graph illustrating a normal distribution $\mathcal{N}(\alpha^k, \sigma^2)$ of the face orientation with respect to the camera viewing angle 530, where $\sigma$ is the standard deviation. The probability of capturing a frontal face of the target $p(f^k|v^k)$ is effectively the area under the normal distribution, limited by cut-off angles $\delta$, $-\delta$, as defined by Equation (3). The cut-off angle $\delta$ is defined as a reasonable face orientation limit for capturing a frontal face. In one example the cut-off angle $\delta=20$ degrees.

$$p(f^k | v^k) = \frac{1}{2}\left(1 + \mathrm{erf}\left(\frac{\delta - \alpha^k}{\sigma\sqrt{2}}\right)\right) - \frac{1}{2}\left(1 + \mathrm{erf}\left(\frac{-\delta - \alpha^k}{\sigma\sqrt{2}}\right)\right) \quad (3)$$

FIG. 6 illustrates a method 600 for determining the face orientation 550 of a target 130 based on the direction of motion 540, as used in one aspect of step 325 of method 300. Method 600 is described by way of example with reference to the target of interest 130 in a scene 700, as illustrated in FIGS. 7A and 7B. Method 600 determines the travel direction 540 based on a first order finite difference approximation to the change in location of the candidate target 130, as observed in a pair of frames captured at two different times.

Method 600 begins at step 605, where a current frame of the scene 700 and a previously captured frame are received as input. Both the current and previous frames include the target 130. At step 610, a point is determined in the current frame that represents the location of the target 130. This point may be determined relative to a bounding box containing the target 130, as detected in one embodiment of step 315 of method 300. For example, the centre of the lowest edge of the bounding box (i.e. the "footprint") may be identified as the location of the target 130. In an alternative embodiment, a centroid of the bounding box may be considered to be the location of the target 130. The centroid may be a preferred location as it is more robust to noise than the lowest edge of the bounding box. Other embodiments may utilize the location of particular parts to locate the candidate target 130. For example, one technique may utilize the head location of the target 130, as detected using an "omega-shape" detector. Similarly, the lowest point on the foreground mask of the target 130 (as detected in one embodiment of step 315) may be selected as the location of the target.

Once the target location is selected, the method proceeds to step 620, where a point is determined in the previously captured frame representing the location of the target. The location of the target 130 may be determined using an identical technique to that used in step 610. This ensures that the relative location of the point between the current and previous frames represents the direction of motion, and not a shift in the location of the point relative to the candidate target.

Method 600 subsequently proceeds to step 630, where the direction of motion of the target is determined based on the locations determined in steps 610 and 620. In one aspect, step 630 computes a vector representing the relative change in the location of the target from the previous frame to the current frame. FIG. 7A illustrates the steps 610, 620 and 630 by way of example. First, the lowest point 740 on the target 130 in the current frame is determined at step 610. Then, the lowest point 730 on the target 130 in the previous frame is determined at step 620. Finally, a vector 750 from the previous location 730 to the current location 740 is computed as a first order finite difference approximation to the direction of motion. This vector is decomposed into a change in position in the horizontal direction of the image, denoted by 754 and represented as $\Delta x$, and a change in position in the vertical direction, denoted by 752 and represented as $\Delta y$.

At step 640, the method 600 determines the orientation of the target 130 with respect to the camera 120 based on the calculated direction of motion. In one aspect, the relative orientation of the target 130 is represented by a bearing angle $\theta$ on the ground plane in the scene. In this embodiment, a bearing angle $\theta$ of 0° represents a target 130 facing the camera 120, as indicated by the direction 760 in FIG. 7B, and a bearing angle of 180° represents target facing away from the camera, as indicated by the direction 765. Let $\varphi$ represent the tilt angle of the camera, where a tilt of 0° corresponds to a horizontal camera and a tilt of 90° corresponds to a downward facing camera. Then, a "Ground Plane Orientation Equation" may be defined in accordance with Equation (4) to approximately compute the bearing angle $\theta$ of the candidate target on the ground plane from the direction of motion represented by $\Delta x$ and $\Delta y$ as follows:

$$\theta = \arctan(\Delta y/(\Delta x \cdot \sin(\varphi))) \quad (4)$$

In one aspect, the bearing angle computed using Equation (4) is selected as the relative orientation of the target 130. Alternatively, the bearing angle computed using Equation (4) is further quantized to the nearest angle in a set of discrete angles. Quantization enables the frontal face detector performance determined at step 305 to be characterized by a small number of possible viewing conditions. The quantization is illustrated by way of example with reference to FIG. 7B, which illustrates a quantization into 8 discrete orientations at regular intervals of 45°. In the example of the motion direction 750 shown in FIG. 7A, the quantization results in a target orientation of 225° as indicated by the direction 770 in FIG. 7A. Method 600 ends when the determined relative orientation of the target 130 is output.

It will be understood that method 600 illustrates one embodiment of step 320, in which the orientation of the target is determined from the direction of motion. Variations of this method are also contemplated within the scope of the present disclosure. For instance, the direction of motion may be estimated from the current frame and two or more previous frames containing the target, based on a second or higher order finite difference approximation to the change in location of the target. Alternatively, the direction of motion may be estimated by a recursive Bayesian filter, such as a Kalman filter or particle filter, based on all previous observations of the target. Other embodiments for step 320 that are not based on the direction of motion are also possible. For example, in one alternative, a machine learning approach is utilized to classify discrete orientation classes and in another alternative, model-based pose estimation is utilized.

FIG. 8 illustrates a method 800 for determining a new camera assignment to capture a frontal face image of a target, as used in one embodiment of step 330. In the exemplary embodiment illustrated in FIG. 1, the camera assignment refers to the assignment of the PTZ camera 120 to a particular target (130, for example) so that a facial image of the target 130 is captured by the PTZ camera 120. Alternatively, camera assignment may refer to determining a region of interest within a high-resolution video stream. The embodiment of method 800 illustrated in FIG. 8 is a numerical search over the space of camera assignments, in which provisional camera assignments are repeatedly selected and tested until the optimal camera assignment is identified.

Method 800 begins at the step 805, where three inputs are received. These include, the frontal face detector performance under all viewing conditions $p(d^k|f^k, v^k)$ as determined in method 200, the probability of capturing at least one frontal face image from previous observations $p(x^{k-1}|d^{k-1}, v^{k-1})$ and all provisional viewing conditions $v_p^k$ of the target 130 with respect to the PTZ camera 120 as determined at step 325.

At step 810, a provisional camera assignment is selected. In one embodiment, the provisional camera assignment is selected based on a set of pre-defined rules. For instance, the rules may define a region of interest on the candidate target, such as the head region. Accordingly, a provisional camera setting is selected to view the head regions in high resolution.

Method 800 then proceeds to step 815, where the viewing conditions are predicted under which the target 130 would be observed if captured using the provisional camera assignment. The predicted viewing conditions, represented by $v_p^{k'}$, include the predicted relative face orientation of the target of interest. In one embodiment, the current relative face orientation $v_p^k$ of the target (as determined at step 320 of method 300) is used as the predicted relative orientation. However, many practical cameras require a short time (the "actuation time") to apply new camera settings and acquire a new frame of the target. For example, a PTZ camera may require a few seconds to change direction and capture a new frame. During this period, the target may also change its relative orientation. To account for these changes, one embodiment of step 815 predicts the future orientation of the target at the time of capturing the next frame based on object tracking and an estimated actuation time. The predicted relative face orientation is used in place of the current orientation in the predicted viewing conditions.

Control then passes to 820, which predicts the posterior probability that at least one frontal face image exists for the target 130 for the selected provisional camera assignment under the predicted viewing conditions determined at step 815. In one embodiment, step 820 is substantially identical to step 335 of method 300. According to Equation (1), the predicted posterior probability $p(x^k|d_p^k, v_p^k)$ that at least one frontal face image exists for the target of interest can be determined based on the previous observations $d^1, d^2, \ldots, d^{k-1}$, the predicted observations $d_p^k$, and the predicted viewing conditions $v_p^k$.

Method 800 then proceeds to step 825, which determines the likelihood of capturing at least one frontal face image of the target 130. In one embodiment, the likelihood is determined by marginalising out the observation $d_p^k$ as given by Equation (5).

$$p(x_p^k | v_p^k) = \sum_{d_p^k} p(x^k | d_p^k, v_p^k) p(d_p^k | v_p^k) \tag{5}$$

In Equation (5), $p(x^k|d_p^k, v_p^k)$ is the posterior probability that at least one frontal face image exists for the target 130 for the selected provisional camera assignment, as determined in step 820. $p(d_p^k|v_p^k)$ is the probability distribution of a frontal face detector output $d_p^k$ for the selected provisional camera assignment to capture the frontal face of the target under the viewing condition $v_p^k$, and $p(d_p^k|v_p^k)$ is determined by Equation (6)

$$p(d_p^k | v_p^k) = \sum_{d_p^k} p(d^k | f_p^k, v_p^k) p(f_p^k | v_p^k) \tag{6}$$

In Equation (6), $p(d^k|f_p^k, v_p^k)$ is the frontal face detector performance, represented by the confusion matrix, as determined in method 200. $p(f_p^k|v_p^k)$ is the probability of capturing a frontal face image of the target 130 with the viewing condition $v_p^k$. In one embodiment, $p(f_p^k|v_p^k)$ is computed in accordance to Equation (3) based on the provisional viewing condition $v_p^k$.

At step 830, a change in rate of information gain about capturing at least one frontal face image of the target 130 is determined if the target 130 were to be observed using the provisional camera assignment. In one embodiment, the change in information gain is a monotonically increasing function and is measured according to the Mutual Information Objective Function in Equation (7).

$$MI(x^k, d_p^k | v_p^k) = \sum_{x^k} \sum_{d_p^k} p(x^k, d_p^k | v_p^k) \log_2 \frac{p(x^k, d_p^k | v_p^k)}{p(x^k | v_p^k) p(d_p^k | v_p^k)} \tag{7}$$

$$= \sum_{x^k} \sum_{d_p^k} p(x^k | d_p^k, v_p^k) p(d_p^k | v_p^k) \log_2 \frac{p(x^k | d_p^k, v_p^k)}{p(x^k | v_p^k)}$$

where, $p(x^k|d_p^k, v_p^k)$ is the posterior probability that at least one frontal face image is captured for the target 130 selected from the provisional camera assignment taking into account the performance of the frontal face detector under the predicted viewing condition $v_p^k$; $p(x^k|v_p^k)$ is the likelihood of capturing at least one frontal face image using the provisional camera assignment; and $p(d_p^k|v_p^k)$ is the probability distribution of a frontal face detector output $d_p^k$ for the selected provisional camera assignment to capture the frontal face image of the target of interest under the viewing condition $v_p^k$.

Since the time for executing a camera action is different depending on the states of the targets and the camera, it is desirable to obtain the largest information gain in the shortest time. Therefore, the rate of mutual information r is used to select the camera assignment. One embodiment of calculating rate of mutual information r is to divide the estimated mutual information by the expected action execution time $t_a$ as given in Equation (8)

$$r = \frac{MI}{t_a} \quad (8)$$

In another embodiment, actions that take a long time to point to a target are penalized. This is because human motion is highly stochastic in nature. The longer the time it takes to point the PTZ camera to the target, the larger the risk the target may have changed path, or in the worst case, exited the scene. To penalize actions that take a long time to point to a target, the rate of mutual information is defined by "Mutual Information Rate Equation" in Equation (9):

$$r = \frac{MI}{(t_T)^n + t_p} \quad (9)$$

In Equation (9), $t_T$ is the estimated transition time for moving the PTZ camera 120 from its current state to point to the target 130, n penalises for actions with long transition time (n=2.5), and $t_p$ is the time a camera spent on observing a target after it locked onto the target. The provisional camera assignment selected at step 810 and the corresponding increase in rate of information gain determined at step 830 comprise a tuple that is stored in computer memory.

Method 800 then proceeds to the decision step 840, which determines whether additional provisional camera assignments need to be processed. In one embodiment, wherein provisional camera assignments are generated based on positions of targets, additional provisional camera settings are processed in sequence until the increase in rate of information gain has been determined for all said provisional camera assignments. If additional provisional camera settings need to be processed, the method loops back to step 810. If no additional provisional camera settings remain, the method proceeds to step 850, which selects a new camera assignment based on the calculated change in rate of information gain for each of the provisional camera assignments. Particularly, the change in rate of information gain for all the provisional camera assignments is compared, and a camera assignment is selected that results in the maximum increase in rate of information gain.

In one example, considering the monitored area 104, the method 800 may select the first provisional camera assignment setting that corresponds to the target having the best viewing condition (i.e., target 130A). The method may subsequently select provisional camera assignment settings in the order of targets 130E, 130D, 130B and 130C as the viewing conditions of these targets sequentially worsen.

In one embodiment, stored tuples recording the provisional camera assignment selected at step 810 and the corresponding change in rate of information gain determined at step 830 in each iteration of method 800 are compared. The camera assignment corresponding to the maximum change (i.e., increase) in rate of information gain is selected as the new camera assignment.

At step 860, the PTZ camera 120 is pointed to the target according to the new camera assignment determined in step 850, and the actual viewing condition $v^k$ is estimated from the captured face image of the target as described in step 320 of method 300. The new observation $d^k$ is made by running the frontal face detector under the estimated viewing condition $v^k$ on the face image.

Method 800 illustrates one embodiment for step 330. Variations of this method may equally be contemplated within the scope of the present disclosure. The embodiments described above correspond to rule-based generation of provisional camera assignments based on positions of the targets. In an alternative embodiment, corresponding to an iterative descent search over the space of camera assignments, a new provisional camera assignment may be determined at step 810 based on the provisional camera assignment in the previous iteration (or the current camera setting for the first iteration). At step 840, the method may then test whether the iterative descent has converged, and step 850 may output the final camera assignment at convergence. In one example of this embodiment, the method 800 may compute an incremental change in the camera assignment based on the gradient of the "Mutual Information Rate Equation" in Equation (9) at step 810, and test whether the change in mutual information rate is below a threshold between successive iterations at step 840.

Figure 9:
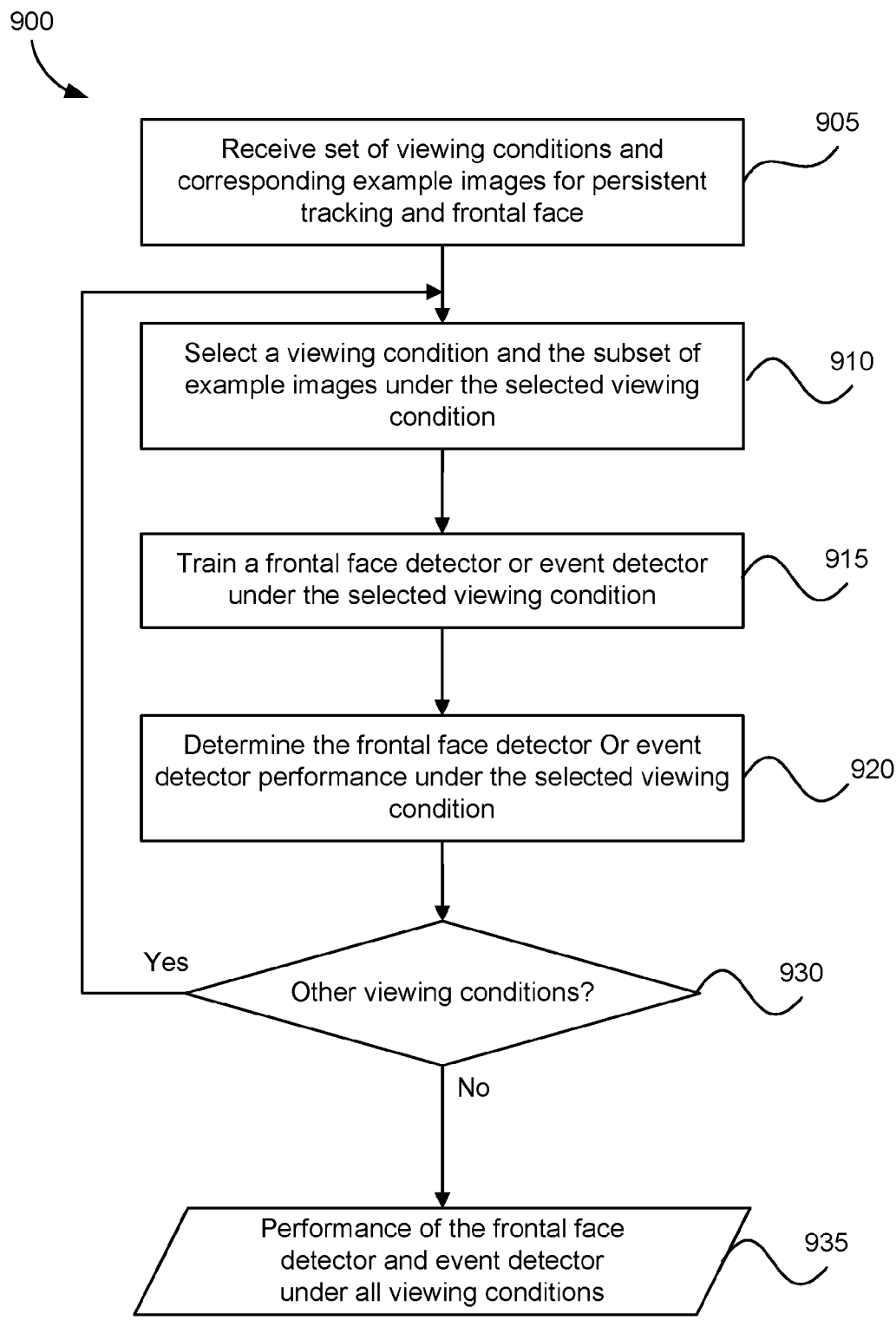
FIG. 9 is a flowchart illustrating a method for determining performance of image detectors under different viewing conditions.

FIGS. 2, 3 and 8 illustrate one embodiment of camera assignment where the task was to capture at least one frontal face for each target in the monitored area. In an alternative embodiment, the network may perform multiple tasks including capturing at least one frontal face for each target in the monitored area, and persistently tracking a suspicious target, such as target 130E in monitored area 104. FIG. 9 is a flowchart illustrating a method for training a frontal face detector and a tracking module for performing the two tasks simultaneously. The method 900 begins at step 905 where a set of viewing conditions and corresponding example images for each viewing condition are received as input from the memory 1234. The set of viewing conditions include the viewing conditions for frontal face capture and for persistent tracking. At step 910, a viewing condition and corresponding images are selected. For the task of frontal face capturing, the viewing conditions refer to the face orientation of the target with respect to the camera viewing angle; whereas, for persistent tracking, the viewing conditions refer to the time spent on observing the suspicious target. The set of example images include both the images for frontal face capturing and those for persistent tracking. For the task of frontal face capturing, the image class labels refer to "frontal face" or "not frontal face"; for the task of persistent tracking, the image class labels refer to "an event has occurred" or "no event has occurred". One example of an event is making phone calls. Another example is handshaking. Yet another example is a smoking action. At step 915, the frontal face detector or the event detector is trained on the example images in the selected viewing condition and at step 920, the performance of the frontal face detector or the event detector is determined under the selected viewing condition. If other viewing conditions remain, the method loops back from step 930 to step 910. Alternatively, if all viewing conditions are processed, the performance of the frontal face detector and the event detector are output and stored in the memory. The event detector may be trained offline and the method of training the event detector is known to people skilled in the art.

Figure 10:
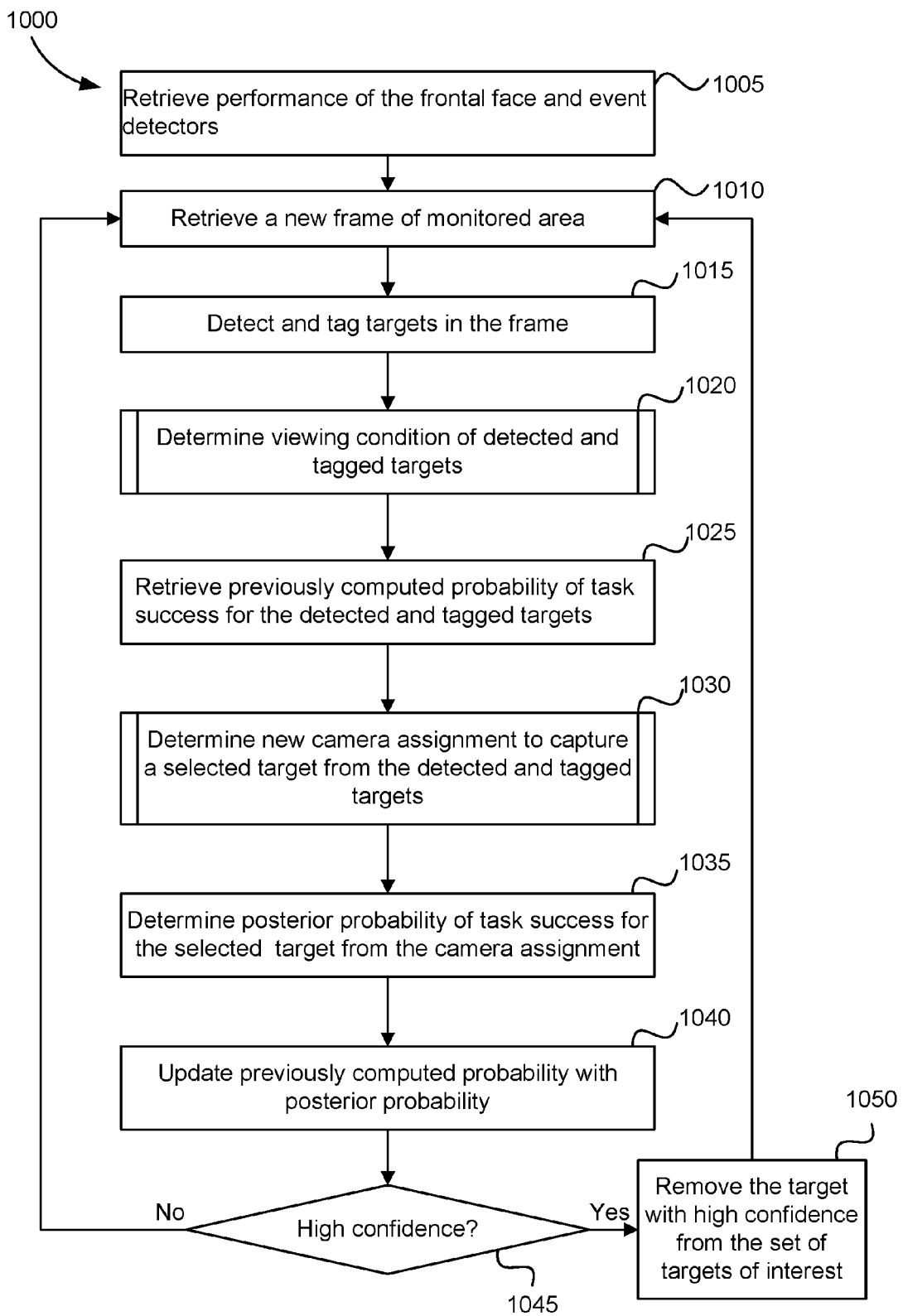
FIG. 10 is a flowchart illustrating a method for controlling a camera to simultaneously capture a frontal face image of each target in a monitored area and persistently track suspicious targets.

FIG. 10 is a flowchart illustrating a method for controlling a camera to capture at least one frontal face for each target in an area and simultaneously track movement of a suspicious target. The method 1000 begins at step 1005 where performance of the frontal face detector and the event detector 935 are retrieved from the memory 1234. At step 1010, a new frame (frame k) of the monitored area 104 captured by the passive camera 160 is received as input. At step 1015, targets are detected in the captured frame and one or more targets are tagged for persistent tracking. In one embodiment, a target engaging in unusual or suspicious activity is tagged in order to analyse the behaviour in greater detail. In another embodiment, a target such as a missing child is selected in order to locate and recover the target. Step 1020 determines the viewing conditions of each detected target and the tagged target. The viewing condition for persistent tracking is the time spent on observing the tagged target of interest, whereas orientation of the target's face is the viewing condition for capturing frontal face images. At step 1025 the prior probability of task success for the different types of tasks is retrieved from the memory 1234. The prior probability includes the prior probability that at least one facial image exists for the detected targets of interest from previous observations, and the prior probability that the event happens for persistent tracking. In one example, the prior probability that the event happens is always set to 0.

Step 1030 select a camera assignment for capturing a selected target from the detected and tagged targets. Specifically, a camera assignment is selected that maximizes the rate of information gained. Step 1035 determines the posterior probability of meeting the different types of tasks, including frontal face capturing and persistent tracking. For persistent tracking, the probability of having at least one event occurring within a fixed time interval is defined in Equation (10), assuming the rate of missing an event follows a Poisson distribution.

$$p(x^k|v_p^k) = 1 - e^{-\lambda} \quad (10)$$

where $\lambda$ is the average event rate for a fixed time interval.

The previously computed probability of capturing a frontal face image for a target or the occurrence of an event is updated based on the calculated posterior probability. Similar to method 300, method 1000 determines whether the posterior probability is higher than a threshold value. If yes, the target with high confidence is removed from the set of targets of interest. Alternatively, the method loops back to step 1010 and repeats itself.

Figure 11:
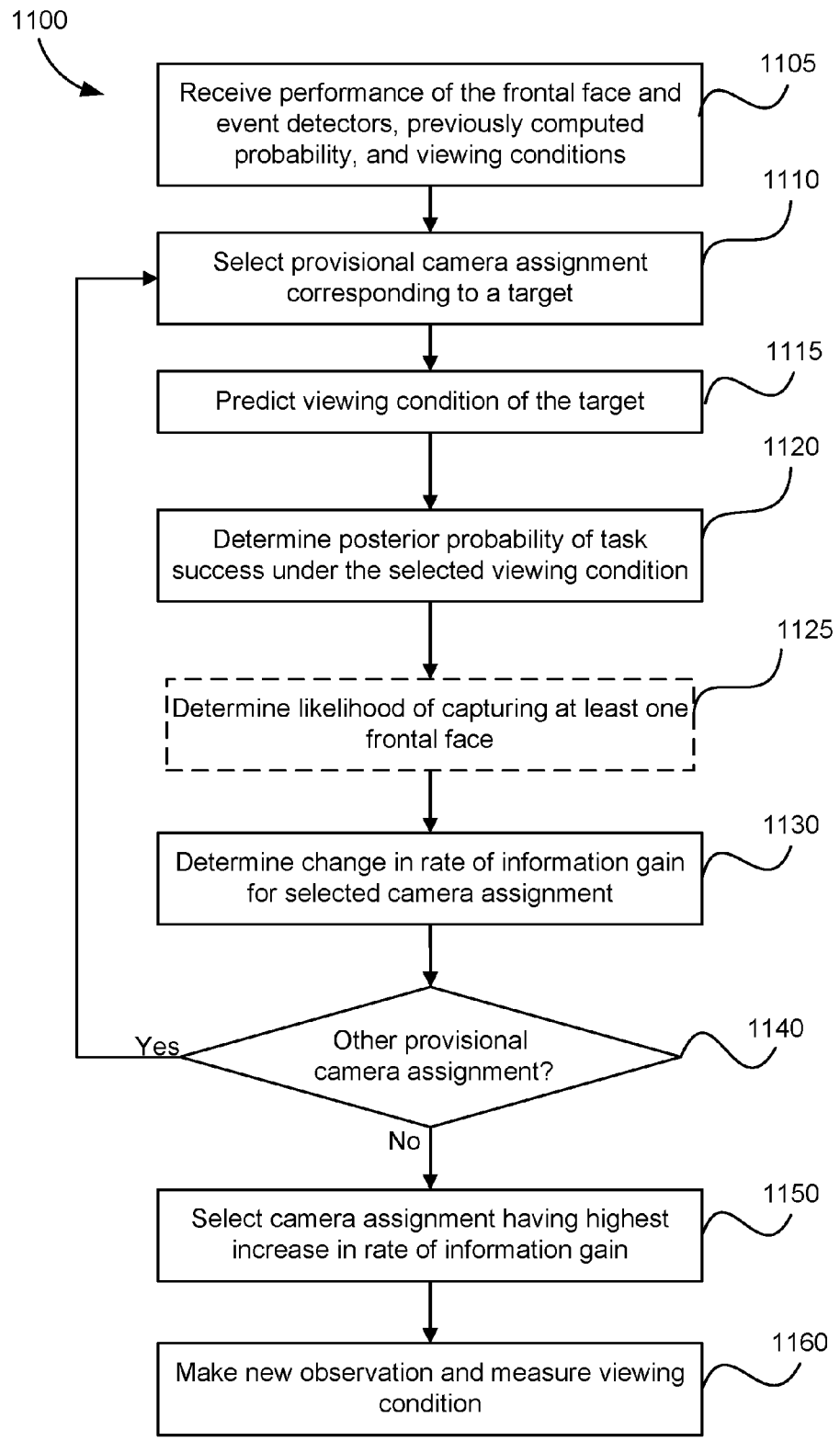
FIG. 11 is a flowchart illustrating a method for selecting a camera assigned according to another aspect of the present disclosure.

FIG. 11 illustrates a method 1100 for determining a new camera assignment for each camera to capture a facial image of a selected target or persistently track a suspicious target. The method begins at step 1105 where performance of the frontal face and event detectors, the probability of capturing at least one frontal face image or event from previous observations, and the viewing conditions for the detected and tagged targets is received. At step 1110, a provisional camera assignment is selected corresponding to a selected target in frame k. At step 1115, the viewing conditions for the selected provisional camera assignment are predicted and at step 1120, the posterior probability of meeting the different tasks under the selected provisional viewing conditions are determined. The different tasks include face acquisition and persistent tracking. For persistent tracking, the probability of having at least one event occurring within a fixed time interval is defined in Equation (10). For face acquisition, the method 1100 takes an additional processing step 1125, which is similar to step 825 of method 800, to determine the likelihood of capturing at least one frontal face image of the selected target. Step 1130 determines the change in rate of information gain about meeting the different tasks under the selected provisional viewing conditions, including face acquisition and persistent tracking. For persistent tracking, the information gain is defined in Equation (11).

$$MI = \sum_{x^k} \sum_{d_p^k} p(x^k, d_p^k | v_p^k) \log_2 \frac{p(x^k, d_p^k | v_p^k)}{p(x^k | v_p^k) p(d_p^k | v_p^k)} \quad (11)$$

$$= \sum_{x^k} \sum_{d_p^k} p(d_p^k | x^k, v_p^k) p(x^k | v_p^k) \log_2 \frac{p(d_p^k | x^k, v_p^k)}{p(d_p^k | v_p^k)}$$

where $p(d_p^k|x^k, v_p^k)$ is performance of event detector determined at step 935 of method 900. $p(d_p^k|v_p^k)$ is the probability of the detector outcome which is defined in Equation (12).

$$p(d_p^k | v_p^k) = \sum_{x^k} p(d_p^k | x^k, v_p^k) p(x^k | v_p^k) \quad (12)$$

For face acquisition, the information gain is defined in Equation (7). The method then performs steps 1110-1130 for all provisional camera assignments and selects the camera assignment with the maximum increase in rate of information gain at step 1150. A new observation is made and a viewing condition is measured at step 1160.

Methods 300, 400, and 1000 describe that a target with high confidence is removed from the set of targets of interest once the posterior probability of task success for the target exceeds a threshold value. However, it will be appreciated that in other embodiments, the targets may not be removed from the set of targets, but may be arranged at the bottom of the set of targets. If no other targets remaining to be observed, the method may return to observing the high confidence targets.

Aspects of the present disclosure provide methods and systems for controlling one or more cameras to perform one or more tasks. Particularly, the methods and systems described herein select a camera assignment based on maximum increase in rate of information gain. It will be appreciated that the methods and systems described herein may be utilized to perform a single task or multiple tasks simultaneously. Moreover, the surveillance system may utilize a single PTZ camera or multiple PTZ cameras as long as a camera assignment is selected such that information gain is maximized.

The invention claimed is:

1. A method for controlling a camera to perform a selected task from a set of tasks, the method comprising:
   determining a viewing condition of the camera to perform each task from the set of tasks;
   determining a posterior probability of task success for each task from the set of tasks based on the determined viewing conditions and a prior probability of task success for each task;
   determining a change in rate of information gain for task success for each task from the set of tasks based on the posterior probability;
   selecting the task to be performed based on the change in rate of information gain; and
   controlling the camera to perform the selected task.

2. The method of claim 1, wherein selecting the task to be performed comprises selecting the task that has a maximum increase in the rate of information gain.

3. The method of claim 1, wherein the selected task includes capturing a frontal face image of a target in a monitored area and/or persistently tracking the target in the monitored area.

4. The method of claim 1 further comprising determining a likelihood of task success based on the posterior probability and performance of a detector under the determined viewing condition of each task.

5. The method of claim 1,
wherein the selected task includes capturing a frontal face image of a target in a monitored area and/or persistently tracking the target in the monitored area, and
wherein the viewing condition of the camera for capturing the frontal face image of the target is an orientation of the face of the target with respect to a viewing direction of the camera.

6. The method of claim 1,
wherein the selected task includes capturing a frontal face image of a target in a monitored area and/or persistently tracking the target in the monitored area,
wherein the viewing condition of the camera for persistently tracking the target is time spent in observing the target.

7. A method for controlling a pan-tilt-zoom (PTZ) camera to capture frontal face images of one or more human targets in a monitored area, the method comprising:
determining a first probability that at least one frontal face image exists for each human target;
predicting a viewing condition of each human target if the PTZ camera is controlled to capture a new image of each human target;
determining a second probability of capturing at least one facial image of each human target if the PTZ camera is controlled to capture the new image of the human target, based on the determined viewing condition; and
controlling the PTZ camera to capture the frontal face image of a selected human target based on the determined first probability and second probability.

8. The method of claim 7, wherein controlling the PTZ camera to capture the frontal face image of the selected human target further comprises:
determining a change in rate of information gain for capturing the frontal face image for each human target based on the first probability and the second probability, and
selecting the human target to be captured having a maximum increase in the rate of information gain.

9. The method of claim 7, further comprising detecting one or more targets in a captured frame of the monitored area.

10. The method of claim 7, further comprising determining a performance of a frontal face detector under a set of viewing conditions.

11. The method of claim 7, further comprising determining a performance of a frontal face detector under a set of viewing conditions,
wherein the viewing condition is an orientation of the face of the human target with respect to a viewing direction of the PTZ camera.

12. The method of claim 7, further comprising determining a performance of a frontal face detector under a set of viewing conditions,
wherein the first probability and the second probability calculated are based on the performance of the frontal face detector under determined viewing condition.

13. A non-transitory computer readable medium comprising instructions executable on a processor for controlling a camera to perform a selected task from a set of tasks, the instructions when executed on the processor performing the steps of:
determining a viewing condition of the camera to perform each task from the set of tasks;
determining a posterior probability of task success for each task from the set of tasks based on the determined viewing conditions and a prior probability of task success for each task;
determining a change in rate of information gain for task success for each task from the set of tasks based on the posterior probability;
selecting the task to be performed based on the change in rate of information gain; and
controlling the camera to perform the selected task.

14. The non-transitory computer readable medium of claim 13, wherein selecting the task to be performed further comprises selecting the task that has a maximum increase in the rate of information gain.

15. A non-transitory computer readable medium comprising instructions executable on a processor for controlling a pan-tilt-zoom (PTZ) camera to capture frontal face images of one or more human targets in a monitored area, the instructions when executed on the processor performing the steps of:
determining a first probability that at least one frontal face image exists for each human target;
predicting a viewing condition of each human target if the PTZ camera is controlled to capture a new image of each human target;
determining a second probability of capturing at least one facial image of each human target if the PTZ camera is controlled to capture the new image of the human target, based on the determined viewing condition; and
controlling the PTZ camera to capture the frontal face image of a selected human target based on the determined first probability and second probability.

16. The non-transitory computer readable medium of claim 15, wherein controlling the PTZ camera to capture the frontal face image of the selected human target further comprises:
determining a posterior probability based on the second probability and the first probability,
determining a change in rate of information gain for capturing the frontal face image for each human target based on the posterior probability, and
selecting the human target to be captured having a maximum increase in the rate of information gain.

17. A system for controlling a camera to perform a selected task from a set of tasks, the system comprising:
a memory for storing data and a computer program;
a program coupled to the memory for executing the computer program, the computer program comprising instructions for:
determining a viewing condition of the camera to perform each task from the set of tasks,
determining a posterior probability of task success for each task from the set of tasks based on the determined viewing conditions and a prior probability of task success for each task,
determining a change in rate of information gain for task success for each task from the set of tasks based on the posterior probability,
selecting the task to be performed based on the change in rate of information gain, and
controlling the camera to perform the selected task.

18. The system of claim 17, wherein selecting the task to be performed comprises selecting the task that has a maximum increase in the rate of information gain.

19. A system for controlling a pan-tilt-zoom (PTZ) camera to capture frontal face images of one or more human targets in a monitored area, the system comprising:
- a memory for storing data and a computer program;
- a program coupled to the memory for executing the computer program, the computer program comprising instructions for:
- determining a first probability that at least one frontal face image exists for each human target,
- predicting a viewing condition of each human target if the PTZ camera is controlled to capture a new image of each human target,
- determining a second probability of capturing at least one facial image of each human target if the PTZ camera is controlled to capture the new image of the human target, based on the determined viewing condition, and
- controlling the PTZ camera to capture the frontal face image of a selected human target based on the determined first probability and second probability.

20. The system of claim 19, wherein the computer program further comprises instructions for:
- determining a posterior probability based on the second probability and the first probability,
- determining a change in rate of information gain for capturing the frontal face image for each human target based on the posterior probability, and
- selecting the human target to be captured having a maximum increase in the rate of information gain.

* * * * *